United States Patent
Murata

(10) Patent No.: US 12,235,006 B2
(45) Date of Patent: Feb. 25, 2025

(54) METHOD OF DISABLING CONTROL STATE THAT SUPPRESSES OUTPUT, PROGRAM, AND AIR-CONDITIONING SYSTEM

(71) Applicant: DAIKIN INDUSTRIES, LTD., Osaka (JP)

(72) Inventor: Naoki Murata, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 457 days.

(21) Appl. No.: 17/757,022

(22) PCT Filed: Sep. 23, 2020

(86) PCT No.: PCT/JP2020/035809
§ 371 (c)(1),
(2) Date: Jun. 8, 2022

(87) PCT Pub. No.: WO2021/131188
PCT Pub. Date: Jul. 1, 2021

(65) Prior Publication Data
US 2023/0019854 A1 Jan. 19, 2023

(30) Foreign Application Priority Data
Dec. 27, 2019 (JP) .................................. 2019-238423

(51) Int. Cl.
F24F 11/63 (2018.01)
F24F 11/32 (2018.01)
(Continued)

(52) U.S. Cl.
CPC .......... *F24F 11/63* (2018.01); *G05B 19/4155* (2013.01); *F24F 11/32* (2018.01);
(Continued)

(58) Field of Classification Search
None
See application file for complete search history.

(56) References Cited

U.S. PATENT DOCUMENTS

2015/0032268 A1* 1/2015 Ino ........................... F24F 11/64
700/276
2015/0120006 A1 4/2015 Terashima et al.
(Continued)

FOREIGN PATENT DOCUMENTS

CN 203163154 U * 8/2013 .............. F24F 11/30
CN 203573126 U * 4/2014 ........... G05B 19/042
(Continued)

OTHER PUBLICATIONS

Corbin et al., "Transactive Control of Commercial Building HVAC Systems", Dec. 2016, Pacific Northwest National Laboratory, US Department of Energy. (Year: 2016).*
(Continued)

*Primary Examiner* — Mohammad Ali
*Assistant Examiner* — Kelvin Booker
(74) *Attorney, Agent, or Firm* — IPUSA, PLLC

(57) ABSTRACT

A method of releasing an output-suppressed control state in an air conditioning system that includes a control device to control one or more air conditioners, and a management device to be connected to the control device via a network to transmit, to the control device, a command to control output suppression of an air conditioner to cause the air conditioner to be in the output-suppressed control state, includes confirming whether communication between the control device and the management device is disconnected; and if the communication between the control device and the management device is not disconnected, prohibiting transmission of a command to release the output-suppressed control state to the control device without intervention of the management device, and if the communication is discon-
(Continued)

nected, allowing transmission of the command to release the output-suppressed control state to the control device without intervention of the management device.

13 Claims, 20 Drawing Sheets

(51) Int. Cl.
    *F24F 11/54* (2018.01)
    *F24F 11/80* (2018.01)
    *G05B 19/41* (2006.01)
    *G05B 19/4155* (2006.01)
    *H04L 12/12* (2006.01)

(52) U.S. Cl.
    CPC .............. *F24F 11/54* (2018.01); *F24F 11/80* (2018.01); *G05B 2219/2614* (2013.01); *H04L 12/12* (2013.01)

(56) References Cited

U.S. PATENT DOCUMENTS

| | | | | |
|---|---|---|---|---|
| 2015/0308703 A1* | 10/2015 | Haze | .................. | G05D 23/1934 700/277 |
| 2016/0209896 A1* | 7/2016 | Yokomizo | .............. | G06Q 20/08 |
| 2020/0088435 A1* | 3/2020 | Inoue | ........................ | F24F 11/62 |

FOREIGN PATENT DOCUMENTS

| | | | | | |
|---|---|---|---|---|---|
| JP | H10-122604 | | 5/1998 | | |
| JP | H11-118225 | | 4/1999 | | |
| JP | 2001-124385 | | 5/2001 | | |
| JP | 2004-192154 | | 7/2004 | | |
| JP | 3551093 | B2 * | 8/2004 | .............. | F24F 11/02 |
| JP | 2004294029 | A * | 10/2004 | .............. | F24F 11/02 |
| JP | 2007-046842 | | 2/2007 | | |
| JP | 2008-281300 | | 11/2008 | | |
| JP | 2011-149572 | | 8/2011 | | |
| JP | 2013024434 | A * | 2/2013 | .............. | F24F 11/02 |
| JP | 2016-076909 | | 5/2016 | | |
| JP | 6073179 | | 2/2017 | | |
| JP | 2017511110 | A * | 7/2017 | .............. | H02J 13/00 |
| JP | 2017143589 | A * | 8/2017 | .............. | F24F 11/02 |
| JP | 6458822 | | 1/2019 | | |
| KR | 100733302 | | 6/2007 | | |
| WO | 2013/118884 | | 8/2013 | | |

OTHER PUBLICATIONS

Escrivá-Escrivá et al., "Application of an energy management and control system to assess the potential of different control strategies in HVAC systems", Feb. 2010, Energy and Buildings 42 (2010) 2258-2267. (Year: 2010).*
International Preliminary Report on Patentability for PCT/JP2020/035809 mailed on Jul. 7, 2022.
Extended European Search Report issued on Dec. 15, 2022 with respect to the corresponding European patent application No. 20907867.4.
International Search Report for PCT/JP2020/035809 mailed on Dec. 8, 2020.

* cited by examiner

FIG.6

USER INFORMATION

| USER ID | PASSWORD | PROPERTY ID | ... |
|---|---|---|---|
| user001 | aaaa | b001 | ... |
| user002 | bbbb | b010,b011 | ... |
| ... | ... | ... | ... |

FIG.7

PROPERTY INFORMATION

| PROPERTY ID | CONTROL DEVICE ID | COMMUNI-CATION ADDRESS | COMMUNICATION STATE INFORMATION | ... |
|---|---|---|---|---|
| b001 | c001 | xx.xx.1.1 | DISCONNECTED | ... |
| b010 | c010 | xx.xx.10.1 | CONNECTED | ... |
| ... | ... | ... | ... | ... |

FIG.8

FACILITY INFORMATION

| CONTROL DEVICE ID | AIR CONDITIONER ID | POWER SUPPRESSION CONTROL STATE INFORMATION | ... |
|---|---|---|---|
| c001 | dk001 | UNDER POWER SUPPRESSION CONTROL | ... |
| ... | ... | ... | ... |

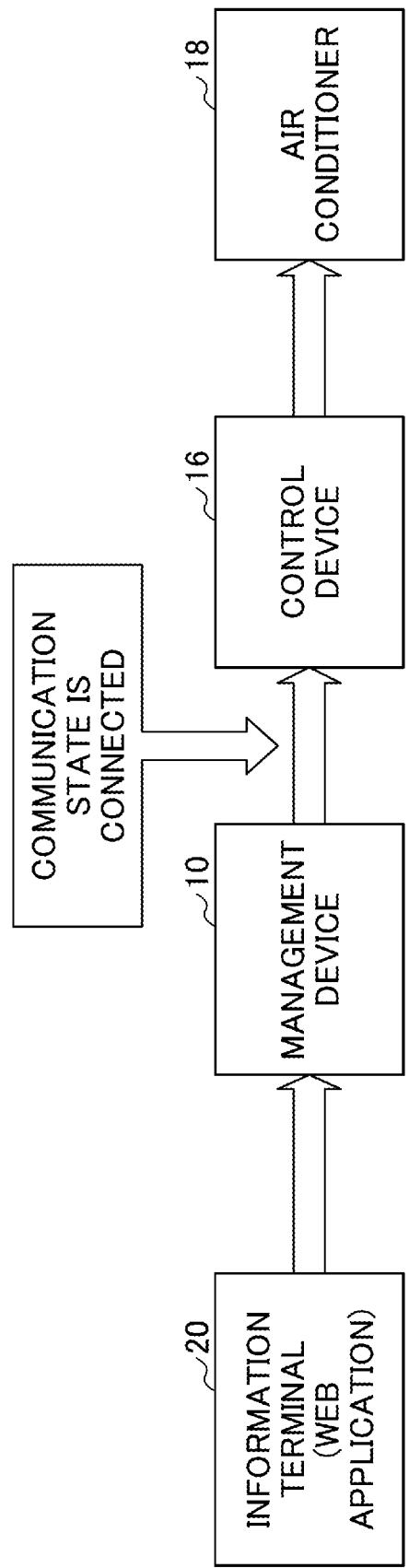

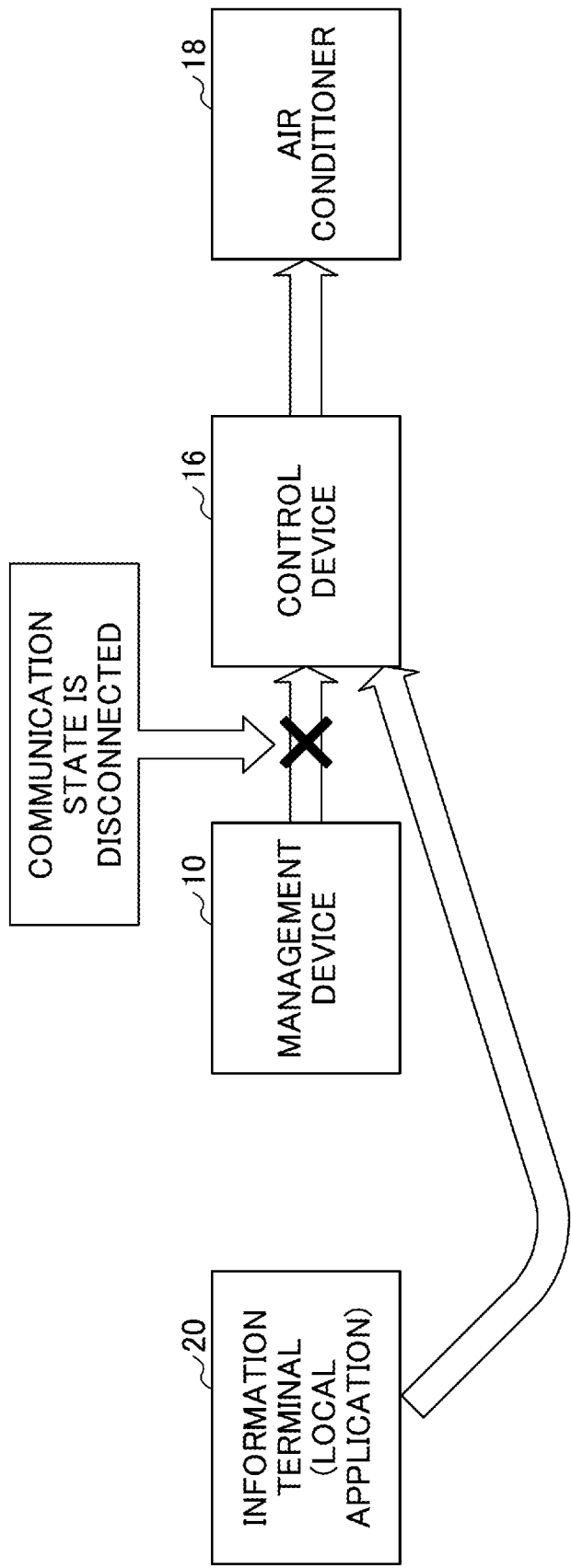

METHOD OF DISABLING CONTROL STATE THAT SUPPRESSES OUTPUT, PROGRAM, AND AIR-CONDITIONING SYSTEM

TECHNICAL FIELD

The present disclosure relates to a method of releasing an output-suppressed control state, a program, and an air conditioning system.

BACKGROUND ART

Conventionally, there has been equipment that outputs an operation prohibition signal to prohibit operation of an air conditioning device, to control the air conditioning device to be in an operation prohibited state. Such an air conditioning device releases prohibition of operation, in response to receiving a release command signal of the operation prohibited state (see, for example, Patent Document 1).

Also, there has been an air conditioning control system combined with mobile communication techniques, in which a mobile communication terminal provides a user with a user interface suitable for monitoring and controlling air conditioners, to allow the user to execute a control operation on any of the air conditioners selected by the user (see, for example, Patent Document 2).

RELATED ART DOCUMENTS

Patent Documents

[Patent Document 1] Japanese Laid-Open Patent Application No. H10-122604
[Patent Document 2] WO2013/118884

SUMMARY OF THE INVENTION

Problem to be Solved by the Invention

For example, in an air conditioning system in which an information terminal controls an air conditioner via a management device, when the air conditioner is controlled to be in an output-suppressed control state from the information terminal, communication between the management device and the air conditioner may be disconnected. In the case where communication between the management device and the air conditioner is disconnected when the air conditioner is controlled in the output-suppressed control state, there is a problem that the output-suppressed control state of the air conditioner cannot be released from the information terminal in response to a request made by the user. Note that Patent Documents 1 and 2 include no description with respect to such a problem.

The present disclosure has an object to provide a method of releasing an output-suppressed control state, a program, and an air conditioning system, with which the output-suppressed control state of an air conditioner can be released even if communication between a management device and the air conditioner is disconnected.

Means for Solving Problem

According to an aspect of the present disclosure, a method of releasing the output-suppressed control state in an air conditioning system that includes a control device configured to control one or more air conditioners, and a management device configured to be connected to the control device via a network to transmit, to the control device, a command to control output suppression of an air conditioner from among the one or more air conditioners to cause the air conditioner to be in the output-suppressed control state, includes a confirmation step of confirming whether communication between the control device and the management device is disconnected; and a transmission control step of, in a case where the communication between the control device and the management device is not disconnected, prohibiting transmission of a command to release the output-suppressed control state to the control device without intervention of the management device, and in a case where the communication between the control device and the management device is disconnected, allowing transmission of the command to release the output-suppressed control state to the control device without intervention of the management device.

According to the present disclosure, in the case where the communication between the control device and the management device is disconnected, by allowing transmission of the command to release the output-suppressed control state to the control device without intervention of the management device, the output-suppressed control state of the air conditioner can be released.

The transmission control step may have a feature that in the case where the communication between the control device and the management device is not disconnected, prohibits transmission of the command to release the output-suppressed control state to the control device from an information terminal operated by a user without intervention of the management device, and in the case where the communication between the control device and the management device is disconnected, allows transmission of the command to release the output-suppressed control state to the control device from the information terminal operated by the user without intervention of the management device.

According to the present disclosure, in the case where the communication between the control device and the management device is disconnected, the output-suppressed control state can be released from the information terminal operated by the user without intervention of the management device.

The command to release the output-suppressed control state may have a feature of being a command to release the output-suppressed control state of a user-side device of the air conditioner.

According to the present disclosure, in the case where the communication between the control device and the management device is disconnected, the output-suppressed control state of the user-side device of the air conditioner can be released from the information terminal operated by the user without intervention of the management device.

There may be a feature that in the output-suppressed control state of the user-side device of the air conditioner, control of setting a target control temperature to a temperature at which output can be suppressed more than at a user-set temperature, is executed.

According to the present disclosure, in the output-suppressed control state, control of setting the target control temperature to a temperature at which the output can be suppressed more than at the user-set temperature can be executed on the user-side device of the air conditioner.

There may be a feature that in a case where the communication between the control device and the management device is recovered from disconnection, a command to control output suppression of the air conditioner that was previously transmitted to the control device via the management device, or could not be transmitted due to disconnected communication, is re-transmitted from the management device.

According to the present disclosure, in the case where communication between the control device and the management device recovers from disconnection, a command to control output suppression of the air conditioner can be re-transmitted from the management device; therefore, the command to control output suppression of the air conditioner from the management device can be executed, and even if control that differs from control considered as desirable by the administrator is executed while the communication is disconnected, after the communication is recovered, the control considered as desirable by the administrator can be executed.

The transmission control step may have a feature of, in the case where the communication between the control device and the management device is not disconnected, prohibiting transmission of a command to the control device without intervention of the management device.

According to the present disclosure, in the case where communication between the control device and the management device is not disconnected, transmission of a command (including commands other than a command to release an output-suppressed control state, such as a command to set a temperature) to the control device without intervention of the management device can be prohibited. A situation in which the control device becomes unmanageable to a certain extent due to multiple information terminals capable of transmitting respective control commands to the control device, can be prevented.

According to an aspect of the present disclosure, a program is provided for releasing an output-suppressed control state from an information terminal operated by a user, in an air conditioning system that includes a control device configured to control one or more air conditioners, and a management device configured to be connected to the control device via a network to transmit, to the control device, a command to control output suppression of an air conditioner from among the one or more air conditioners to cause the air conditioner to be in the output-suppressed control state. The program causes the information terminal to execute a method including a confirmation step of confirming whether communication between the control device and the management device is disconnected; and a transmission control step of, in a case where the communication between the control device and the management device is not disconnected, prohibiting transmission of a command to release the output-suppressed control state to the control device without intervention of the management device, and in a case where the communication between the control device and the management device is disconnected, allowing transmission of the command to release the output-suppressed control state to the control device without intervention of the management device.

According to the present disclosure, in the case where communication between the control device and the management device is disconnected, by allowing transmission of the command to release the output-suppressed control state to the control device without intervention of the management device, even in the case where the communication between the control device and the management device is disconnected, the output-suppressed control state of the air conditioner can be released.

According to an aspect of the present disclosure, an air conditioning system includes a control device configured to control one or more air conditioners; and a management device configured to be connected to the control device via a network to transmit, to the control device, a command to control output suppression of an air conditioner from among the one or more air conditioners to cause the air conditioner to be in the output-suppressed control state, wherein a control unit confirms whether communication between the control device and the management device is disconnected, and executes, in a case where the communication between the control device and the management device is not disconnected, prohibiting transmission of a command to release the output-suppressed control state to the control device without intervention of the management device, and in a case where the communication between the control device and the management device is disconnected, allowing transmission of the command to release the output-suppressed control state to the control device without intervention of the management device.

According to the present disclosure, in the case where communication between the control device and the management device is disconnected, by allowing transmission of the command to release the output-suppressed control state to the control device without intervention of the management device, even in the case where the communication between the control device and the management device is disconnected, the output-suppressed control state of the air conditioner can be released.

The control unit may have a feature that in the case where the communication between the control device and the management device is not disconnected, prohibits transmission of the command to release the output-suppressed control state to the control device from an information terminal operated by a user without intervention of the management device, and in the case where the communication between the control device and the management device is disconnected, allows transmission of the command to release the output-suppressed control state to the control device from the information terminal operated by the user without intervention of the management device.

According to the present disclosure, in the case where the communication between the control device and the management device is disconnected, the output-suppressed control state can be released from the information terminal operated by the user without intervention of the management device.

The command to release the output-suppressed control state may have a feature of being a command to release the output-suppressed control state of a user-side device of the air conditioner.

According to the present disclosure, in the case where the communication between the control device and the management device is disconnected, the output-suppressed control state of the user-side device of the air conditioner can be released from the information terminal operated by the user without intervention of the management device.

There may be a feature that in the output-suppressed control state of the user-side device of the air conditioner, control of setting a target control temperature to a temperature at which output can be suppressed more than at a user-set temperature, is executed.

According to the present disclosure, in the output-suppressed control state, control of setting the target control temperature to a temperature at which the output can be suppressed more than at the user-set temperature can be executed on the user-side device of the air conditioner.

There may be a feature that in a case where the communication between the control device and the management device is recovered from disconnection, a command to control output suppression of the air conditioner that was previously transmitted to the control device via the management device, or could not be transmitted due to disconnected communication, is re-transmitted from the management device.

According to the present disclosure, in the case where communication between the control device and the management device recovers from disconnection, a command to control output suppression of the air conditioner can be re-transmitted from the management device; therefore, the command to control output suppression of the air conditioner from the management device can be followed.

The control unit has a feature of, in the case where the communication between the control device and the management device is not disconnected, prohibiting transmission of a command to the control device without intervention of the management device.

According to the present disclosure, in the case where communication between the control device and the management device is not disconnected, transmission of a command to the control device without intervention of the management device can be prohibited.

BRIEF DESCRIPTION OF THE DRAWINGS

FIG. 6 is a configuration diagram of an example of user information;

FIG. 7 is a configuration diagram of an example of property information;

FIG. 8 is a configuration diagram of an example of facility information;

FIG. 9A is an explanatory diagram of an example of an overview of processing executed by the air conditioning system according to the present embodiment;

FIG. 9B is an explanatory diagram of an example of an overview of processing executed by the air conditioning system according to the present embodiment;

EMBODIMENTS FOR CARRYING OUT THE INVENTION

Next, embodiments of the present invention will be described in detail.

First Embodiment

<System Configuration>

Figure 1:
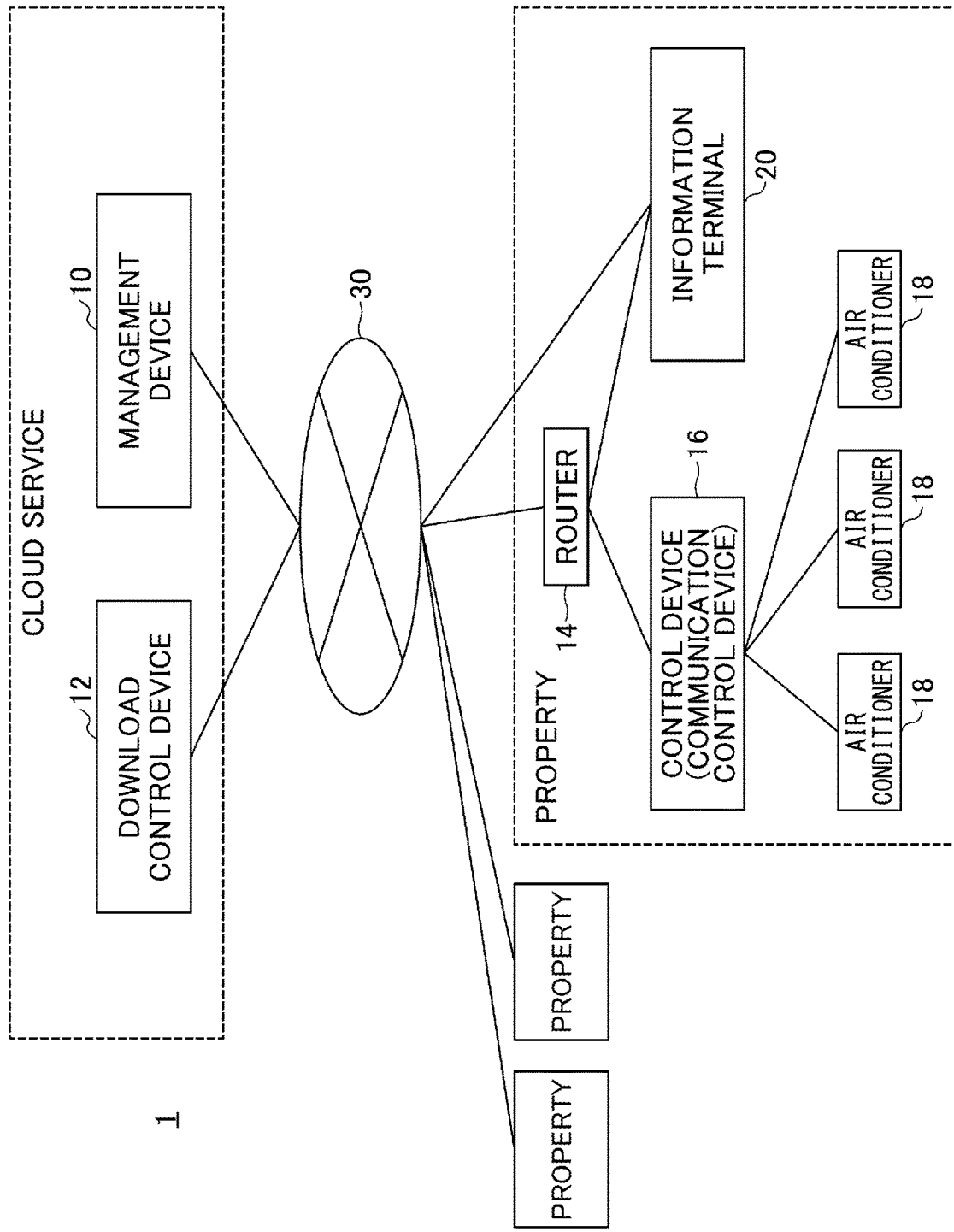
FIG. 1 is a configuration diagram of an example of an air conditioning system according to a present embodiment.

FIG. 1 is a configuration diagram of an example of an air conditioning system according to the present embodiment. An air conditioning system 1 includes a management device 10, a download control device 12, a router 14, a control device 16, air conditioners 18, and an information terminal 20.

The management device 10 and the download control device 12 are connected to a network 30 such as the Internet, and provides cloud services. Note that the names of the management device 10 and the download control device 12 are examples and may be referenced with other names.

The router 14, the control device 16, and the air conditioners 18 are provided in a property such as a building. The information terminal 20 may be provided in the property or carried by the user. The router 14 is connected to the network 30. The control device 16 is connected to the network 30 via the router 14. Also, the control device 16 is communicably connected to one or more air conditioners 18 as targets to be controlled.

The information terminal 20 is connected to the network 30 via the router 14. The information terminal 20 may be connected to the network 30 via a wireless communication system of 3G, 4G, 5G, or the like. Also, the information terminal 20 is communicably connected to the control device 16 via a local network such as a LAN (Local Area Network) built by the router 14.

Note that in FIG. 1, although the router 14, the control device 16, the air conditioner 18, and the information terminal 20 of the rightmost property are illustrated as an example of the configuration, for each of the other properties, a router 14, a control device 16, air conditioners 18, and an information terminal 20 are also provided in substantially the same way. Also, although FIG. 1 illustrates an example in which three units of air conditioners 18 are provided in one property, the number of units may be other than three.

The air conditioner 18 adjusts the temperature, humidity, and the like of air in a room or the like in the property. A room or the like in which the air conditioner 18 adjusts the temperature, humidity, and the like of air may also be referred to as a space to be air-conditioned. The air conditioner 18 is, for example, a separate-type air conditioner having an indoor unit (a user-side device) and an outdoor unit (a heat source-side device) provided separately. Alternatively, the air conditioner 18 may be, for example, an integrated-type air conditioner in which functions of an indoor unit and functions of an outdoor unit are combined.

The information terminal 20 is an information processing terminal that can be operated by the user, such as a mobile phone, smartphone, tablet terminal, PC, or the like. The information terminal 20 has a Web browser installed. In the case where communication between the management device 10 and the control device 16 is connected, the information terminal 20 can download and execute a Web application for executing processing related to the air conditioner 18 from the download control device 12. The Web application establishes connection to the management device 10, and causes the management device 10 to execute the processing related to the air conditioner 18.

In the case where the communication between the management device 10 and the control device 16 is disconnected, the information terminal 20 can download and execute a local application for executing processing related to the air conditioner 18 from the download control device 12. The local application establishes connection to the control device 16 via the local network without intervention of the management device 10, to execute the processing related to the air conditioner 18. Through the information terminal 20 having the local application downloaded and installed, the user can execute the processing related to the air conditioner 18 even in the case where communication between the management device 10 and the control device 16 is disconnected.

Note that the functions implemented by the local application may not be the same as the functions implemented by the Web application, and may be part of the functions implemented by the Web application. The functions implemented by the local application and the functions implemented by the Web applications will be described in detail later.

The control device 16 controls the air conditioner 18, according to a control command directed to the air conditioner 18 as the target to be controlled, received from the management device 10 or the information terminal 20. The management device 10 discloses a UI (user interface) to the information terminal 20, and based on operation contents of the user received from the information terminal 20, executes processing related to the air conditioner 18 as will be described later, such as monitoring and operation of the air conditioner 18. Also, the download control device 12 is an example of a cloud service that provides the local application, for example, provides a content delivery service.

The air conditioning system 1 in FIG. 1 is an example of a cloud service, and may be an information processing system implemented by one or more computers. Also, the air conditioning system 1 in FIG. 1 is an example, and it is needless to say that there are various examples of system configurations depending on the application and purpose. For example, the air conditioner 18 is an example of equipment to be controlled, and may be equipment other than the air conditioner 18.

<Hardware Configuration>

Figure 2:
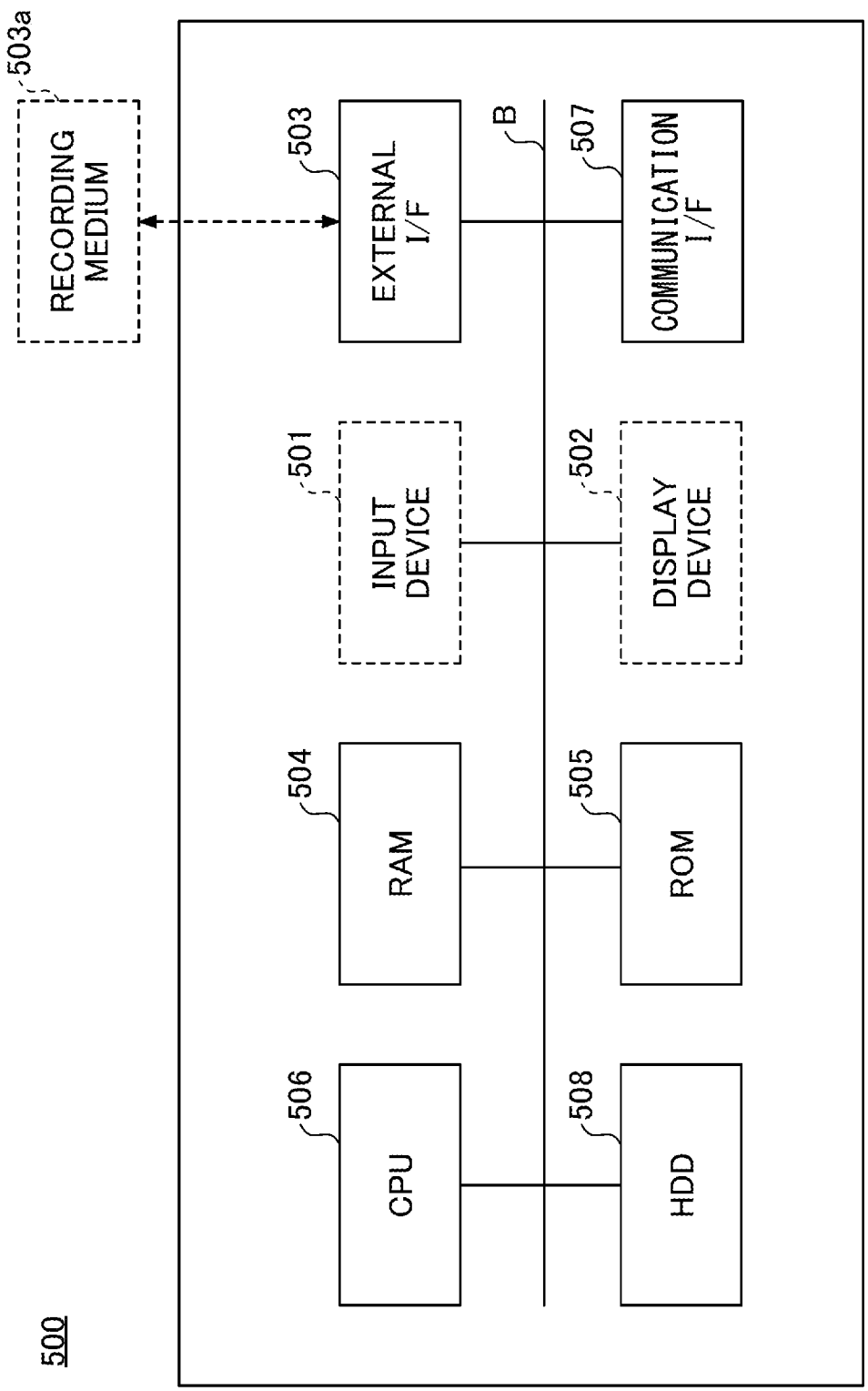
FIG. 2 is a hardware configuration diagram of an example of a computer according to the present embodiment.

Each of the management device 10, the download control device 12, the control device 16, and the information terminal 20 in FIG. 1 is implemented by, for example, a computer 500 having a hardware configuration illustrated in FIG. 2. Note that hardware configurations of the router 14 and the air conditioner 18 are omitted.

FIG. 2 is a hardware configuration diagram of an example of a computer according to the present embodiment. The computer 500 in FIG. 2 includes an input device 501, a display device 502, an external I/F 503, a RAM 504, a ROM 505, a CPU 506, a communication I/F 507, and an HDD 508, that are interconnected by a bus B. Note that the input device 501 and the display device 502 may be configured be connected and used when necessary.

The input device 501 includes a touch panel, operation keys, buttons, a keyboard, a mouse, and the like used by the user to input various signals. The display device 502 is constituted with a display of liquid crystal, organic EL, or the like for displaying a screen; a speaker for outputting sound data such as voice and music; and the like. The communication I/F 507 is an interface to have the computer 500 connected to a network such as the network 30. Accordingly, the computer 500 can execute data communication through the communication I/F 507.

Also, the HDD 508 is an example of a non-volatile storage device to store programs and data. The stored programs and data include an OS as basic software that controls the entire computer 500, and applications that provide various functions on the OS.

Note that the computer 500 may use a drive device using a flash memory as the storage medium (e.g., a solid state drive: SSD) instead of the HDD 508.

The external I/F 503 is an interface with an external device. The external device includes a recording medium 503a. Accordingly, the computer 500 can read and/or write on the recording medium 503a through the external I/F 503. The recording medium 503a includes a flexible disk, CD, DVD, SD memory card, USB memory, or the like.

The ROM 505 is an example of a non-volatile semiconductor memory (a storage device) that is capable of holding the programs and data even when the power is turned off. The ROM 505 stores programs and data such as a BIOS to be executed when staring up the computer 500, OS settings, network settings, and the like. The RAM 504 is an example of a volatile semiconductor memory (a storage device) to temporarily hold the programs and data.

The CPU 506 is an arithmetic/logic unit to implement control and functions of the entire computer 500, by reading programs and data onto the RAM 504 from a storage device such as the ROM 505 or the HDD 508, to execute processing, that corresponds to a control unit in the claims.

According to the present embodiment, the management device 10, the download control device 12, the control device 16, and the control unit corresponding to the CPU 506 of the information terminal 20 can execute various types of processing as will be described later.

<Software Configuration>
<<Functional Blocks>>

Figure 3:
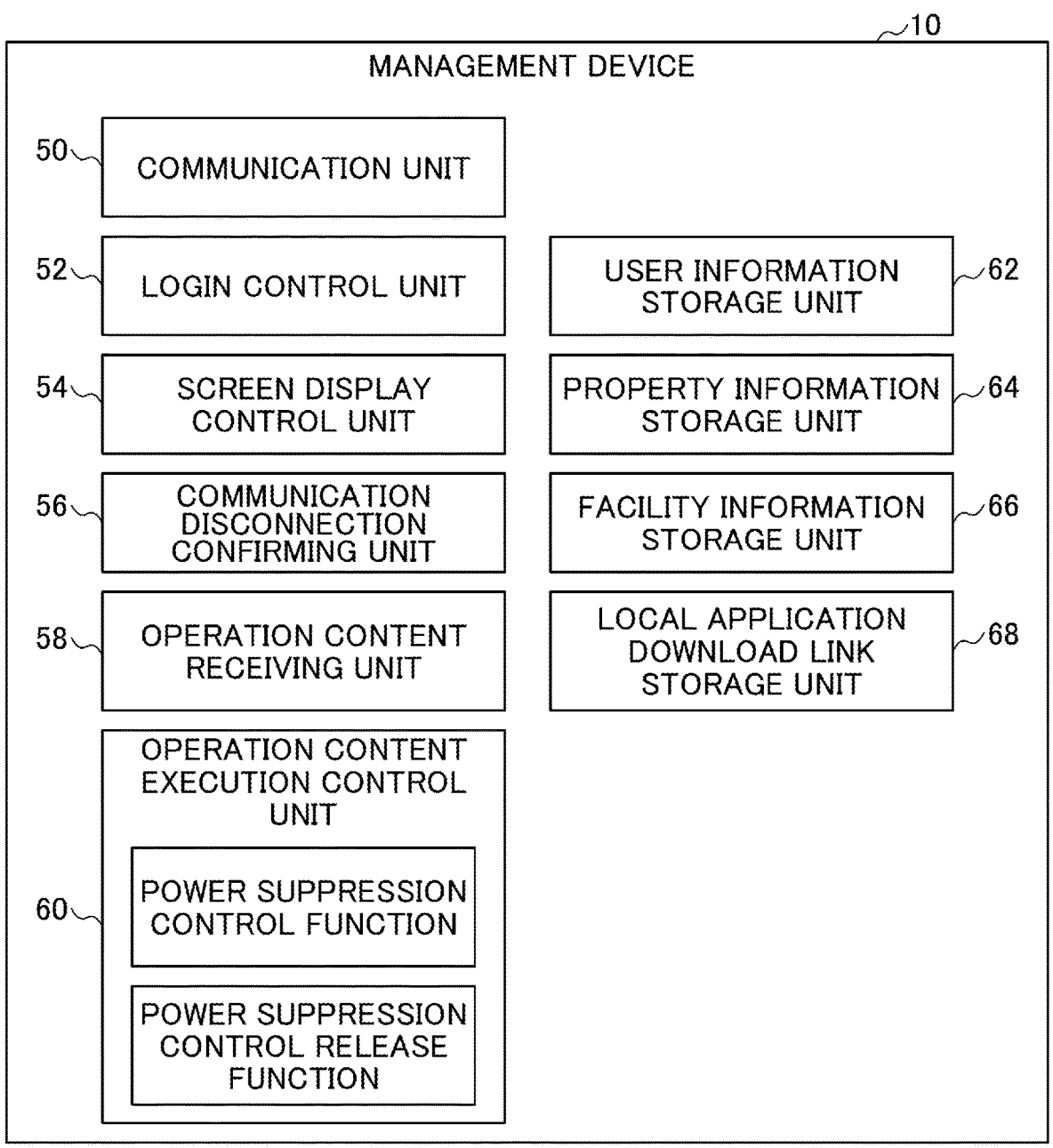
FIG. 3 is a functional block diagram of an example of a management device according to the present embodiment.

Functional blocks of the management device 10, the control device 16, and the information terminal 20 of the air conditioning system 1 according to the present embodiment will be described. FIG. 3 is an example of a functional block diagram of the management device according to the present embodiment. By executing programs, the management device 10 implements a communication unit 50, a login control unit 52, a screen display control unit 54, a communication disconnection confirming unit 56, an operation content receiving unit 58, an operation content execution control unit 60, a user information storage unit 62, a property information storage unit 64, a facility information storage unit 66, and a local application download link storage unit 68.

Note that in the functional block diagram illustrated in FIG. 3, functions not required in the description of the air conditioning system 1 according to the present embodiment are omitted as appropriate.

The communication unit 50 communicates via the network 30. The login control unit 52 uses user information to control a login process from the information terminal 20.

The user information is stored in the user information storage unit 62. Note that the user information will be described in detail later.

The screen display control unit 54 generates image data of various screens to be displayed on the information terminal 20. The various screens to be displayed on the information terminal 20 include a login screen, a cloud service screen, a local application download link screen, and the like as will be described later. The screen display control unit 54 uses the user information, property information, facility information, and local application download link information, to control generation of the image data of the various screens.

Note that in the present embodiment, as one example, although an example in which the screen display control unit 54 is implemented in the management device 10, for example, in the case of using a method of SPA (Single Page Application), functions of the screen display control unit 54 of the management device 10 may be implemented as functions of the information terminal 20. By using the method of SPA, the information terminal 20 can generate the image data of the various screens, and executes screen display control.

The property information is stored in the property information storage unit 64. The facility information is stored in the facility information storage unit 66. Also, the local application download link information is stored in the local application download link storage unit 68. Note that the property information, the facility information, and the local application download link information will be described in detail later.

The communication disconnection confirming unit 56 confirms connection/disconnection of communication between the communication unit 50 of the management device 10 and the control device 16 provided in the property. The connection/disconnection of communication between the communication unit 50 of the management device 10 and the control device 16 provided in the property is confirmed by, for example, by accessing the communication address of the control device 16 provided in the property from the communication unit 50 of the management device 10 at predetermined intervals.

The operation content receiving unit 58 receives operation contents for executing processing related to the air conditioner 18 from the information terminal 20. Based on the operation contents received from the information terminal 20, the operation content execution control unit 60 executes processing related to the air conditioner 18. Note that the operation content execution control unit 60 in FIG. 3 has a power suppression control function and a power suppression control release function as examples of the processing related to the air conditioner 18.

The power suppression control function is a function of causing the air conditioner 18 as the target to be controlled, to be fixed in a power suppression control state regardless of the room temperature. Also, the power suppression control release function is a function of releasing the power suppression control state of the air conditioner 18. The air conditioner 18 of the power suppression control state does not exchange heat until the power suppression control state is released. Note that the processing related to the air conditioner 18 includes a function of displaying property information, facility information, and the like stored in the management device 10 on the information terminal 20.

Figure 4:
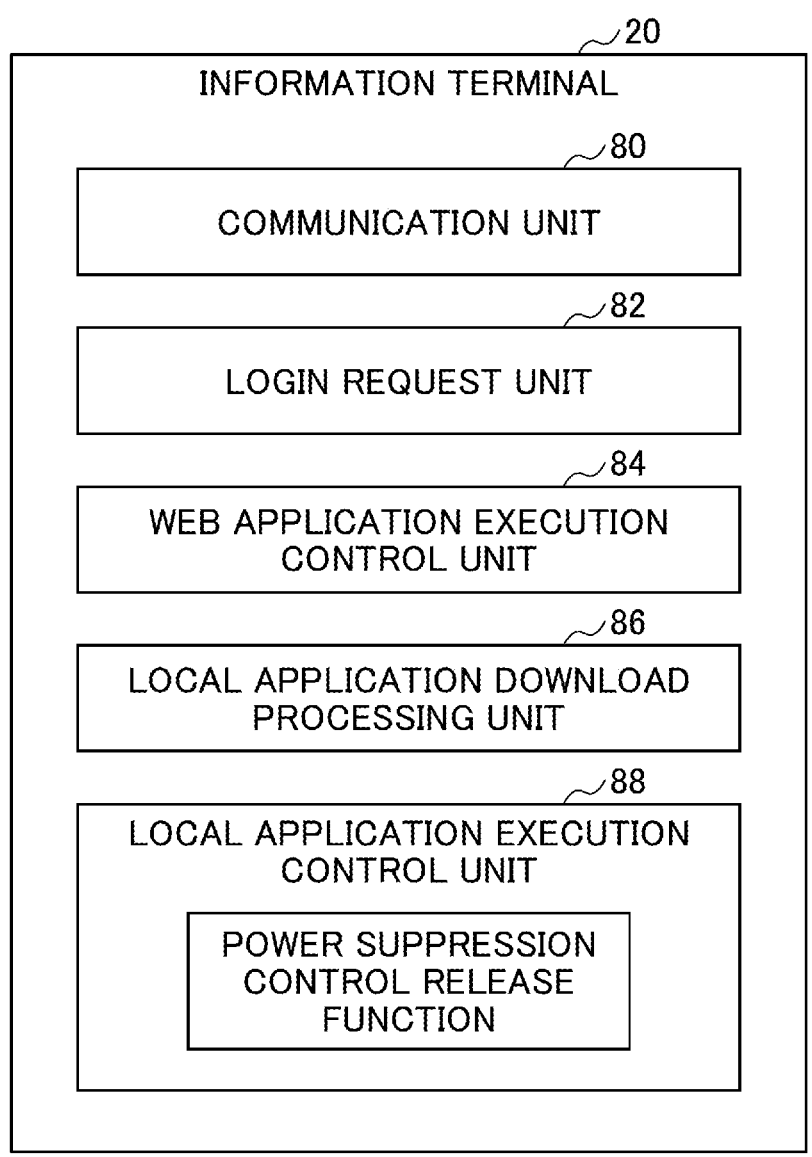
FIG. 4 is a functional block diagram of an example of an information terminal according to the present embodiment.

FIG. 4 is a functional block diagram of an example of the information terminal according to the present embodiment. By executing programs such as the Web browser, the Web application, the local application, and the like, the information terminal 20 implements a communication unit 80, a login request unit 82, a Web application execution control unit 84, a local application download processing unit 86, and a local application execution control unit 88.

Note that in the functional block diagram illustrated in FIG. 4, functions not required in the description of the air conditioning system 1 according to the present embodiment are omitted as appropriate.

The communication unit 80 communicates via the router 14. Also, the communication unit 80 communicates via a wireless communication system of 3G, 4G, 5G, or the like. Based on operation contents of the user on the login screen, the login request unit 82 makes a login request to the management device 10 or the control device 16, and receives a login result from the management device 10.

The Web application execution control unit 84 controls execution of the downloaded Web application. The local application download processing unit 86 downloads the local application from the download control device 12, based on operation contents of the user on the local application download link screen.

The local application execution control unit 88 executes processing related to the air conditioner 18, based on operation contents received from the user. The local application execution control unit 88 in FIG. 4 has a power suppression control release function as an example of the processing related to the air conditioner 18.

In this way, in the air conditioning system 1 according to the present embodiment, the Web application implements the power suppression control function and the power suppression control release function, and the local application implements the power suppression control release function.

Figure 5:
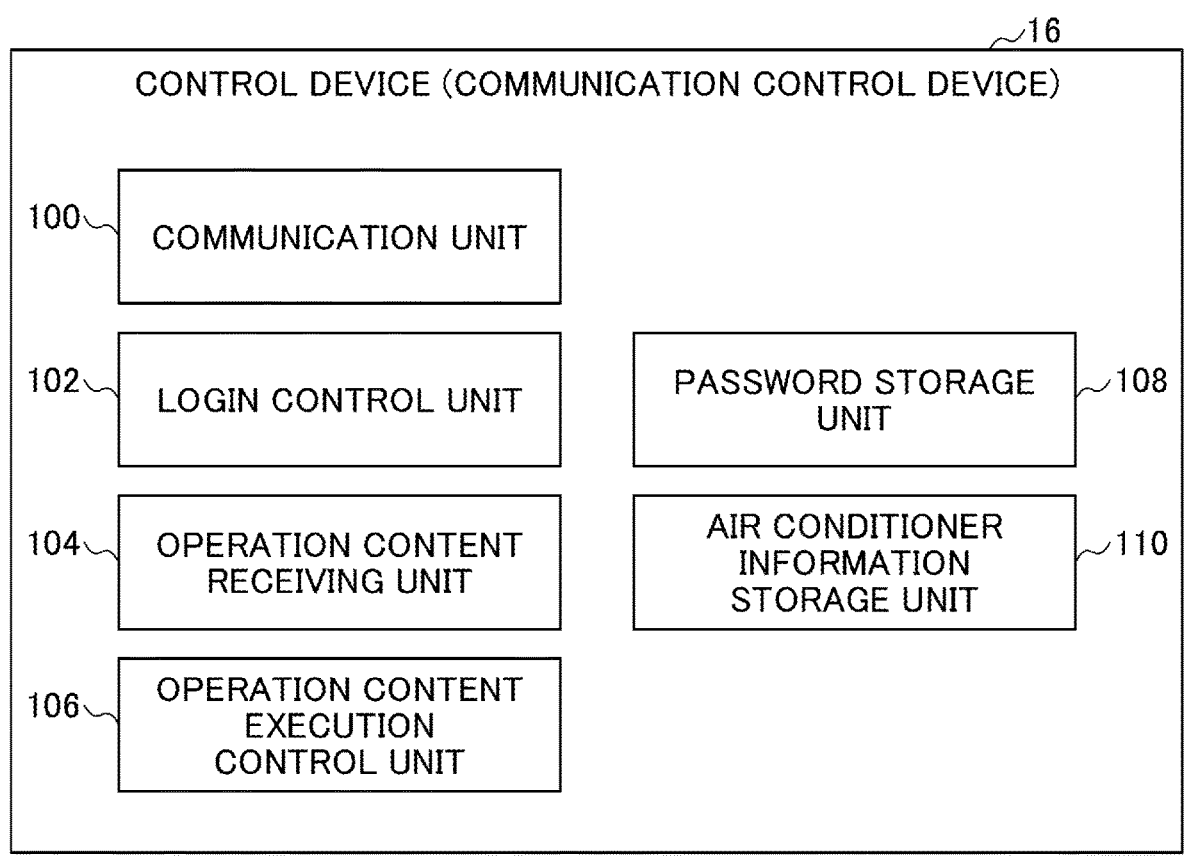
FIG. 5 is a functional block diagram of an example of a control device according to the present embodiment.

FIG. 5 is a functional block diagram of an example of the control device according to the present embodiment. By executing programs, the control device 16 implements a communication unit 100, a login control unit 102, an operation content receiving unit 104, an operation content execution control unit 106, a password storage unit 108, and an air conditioner information storage unit 110.

Note that in the functional block diagram illustrated in FIG. 5, functions not required in the description of the air conditioning system 1 according to the present embodiment are omitted as appropriate.

The communication unit 100 communicates via the router 14. Also, the communication unit 100 communicates with the air conditioner 18. In the case where communication with the management device 10 is disconnected, the login control unit 102 uses password information to control a login process from the information terminal 20. Note that the password information is stored in the password storage unit 108. The password information stored in the password storage unit 108 is information used by the user to log in on the control device 16, such as the control device ID and the password.

In the case where communication with the management device 10 is connected, the operation content receiving unit 104 receives operation contents for executing processing related to the air conditioner 18 from the management device 10. Also, in the case where communication with the management device 10 is disconnected, the operation content receiving unit 104 receives operation contents for executing processing related to the air conditioner 18 from the information terminal 20.

Based on the operation contents received from the management device 10 or the information terminal 20, the operation content execution control unit 106 executes processing related to the air conditioner 18, by using air conditioner information. The air conditioner information is stored in the air conditioner information storage unit 110. The air conditioner information stored in the air conditioner information storage unit 110 is, for example, power suppression control state information of the air conditioner 18.

The user information stored in the user information storage unit 62 of the management device 10 is configured, for example, as illustrated in FIG. 6. FIG. 6 is a configuration diagram of an example of the user information. As illustrated in FIG. 6, the user information includes, as items, user ID, password, and property ID.

The user ID is one example of identification information of the user. The password is an example of authentication information of the user. The property ID is one example of identification information of the property associated with the user. According to the user information in FIG. 6, a login process of the user can be executed. Also, according to the user information in FIG. 6, the property associated with the user who successfully logged in can be identified.

The property information stored in the property information storage unit 64 of the management device 10 is configured, for example, as illustrated in FIG. 7. FIG. 7 is a configuration diagram of an example of the property information. The property information illustrated in FIG. 7 includes, as items, property ID, control device ID, communication address, and communication state information.

The property ID is one example of identification information of the property. The control device ID is one example of identification information of the control device 16 provided in the property. The communication address is an example of information required for communication, such as the IP address of the control device 16 that is identified with the control device ID. The communication state information is an example of information representing the state of connection/disconnection of communication with the management device 10.

According to the property information in FIG. 7, the communication address of the control device 16 provided in the property can be identified. Also, according to the property information in FIG. 7, the state of connection/disconnection of communication with the control device 16 that is identified with the control device ID, can be confirmed. Note that upon receiving a selection of a property on a cloud service screen 1000, the management device 10 may determine whether the communication with the control device 16 in the selected property is connected/disconnected, by accessing the communication address of the control device 16.

The facility information stored in the facility information storage unit 66 of the management device 10 is configured, for example, as illustrated in FIG. 8. FIG. 8 is a configuration diagram of an example of the facility information. The facility information illustrated in FIG. 8 includes, as items, control device ID, air conditioner ID, and power suppression control state information.

The control device ID is one example of identification information of the control device 16. The air conditioner ID is one example of identification information of the air conditioner 18 provided in the property. The power suppression control state information is information representing whether or not the air conditioner 18 identified with the air conditioner ID is under power suppression control.

According to the facility information in FIG. 8, an air conditioner 18 can be identified that is provided in the property, the air conditioner 18 being a target to be controlled by the control device 16 identified with the control device ID. Also, according to the facility information in FIG. 8, whether or not the air conditioner 18 identified with the air conditioner ID is under power suppression control, can be identified.

<Processing>

FIGS. 9A and 9B are explanatory diagrams of an example of an overview of processing executed by the air conditioning system according to the present embodiment. In the air conditioning system 1 according to the present embodiment, depending on the communication state between the management device 10 and the control device 16, the method of executing processing related to the air conditioner 18, such as release of the power suppression control state of the air conditioner 18 from the information terminal 20, differs.

FIG. 9A illustrates a method of executing processing related to the air conditioner 18 from the information terminal 20, in the case where the communication state between the management device 10 and the control device 16 is connected. FIG. 9B illustrates a method of executing processing related to the air conditioner 18 from the information terminal 20, in the case where the communication state between the management device 10 and the control device 16 is disconnected.

As illustrated in FIG. 9A, in the case where the communication state between the management device 10 and the control device 16 is connected, the information terminal 20 can operate the air conditioner 18 via the management device 10 and the control device 16 by executing the Web application. However, in the method in FIG. 9A, in the case where the communication state between the management device 10 and the control device 16 becomes disconnected for some reason, the air conditioner 18 cannot be operated from the information terminal 20.

In the case where the communication state between the management device 10 and the control device 16 becomes disconnected for some reason, as illustrated in FIG. 9B, the air conditioning system 1 according to the present embodiment establishes a connection to the control device 16 via the local network without intervention of the management device 10, so as to be capable of operating the air conditioner 18.

Therefore, in the air conditioning system 1 according to the present embodiment, the local application can be downloaded from the download control device 12 to the information terminal 20.

The local application is an application that establishes connection to the control device 16 via the local network without intervention of the management device 10, to be capable of executing processing related to the air conditioner 18, such as releasing the power suppression control state of the air conditioner 18. Therefore, the information terminal 20 having the local application downloaded and installed can operate the air conditioner 18 even in a communication state in which communication between the management device 10 and the control device 16 is disconnected.

Figure 10:
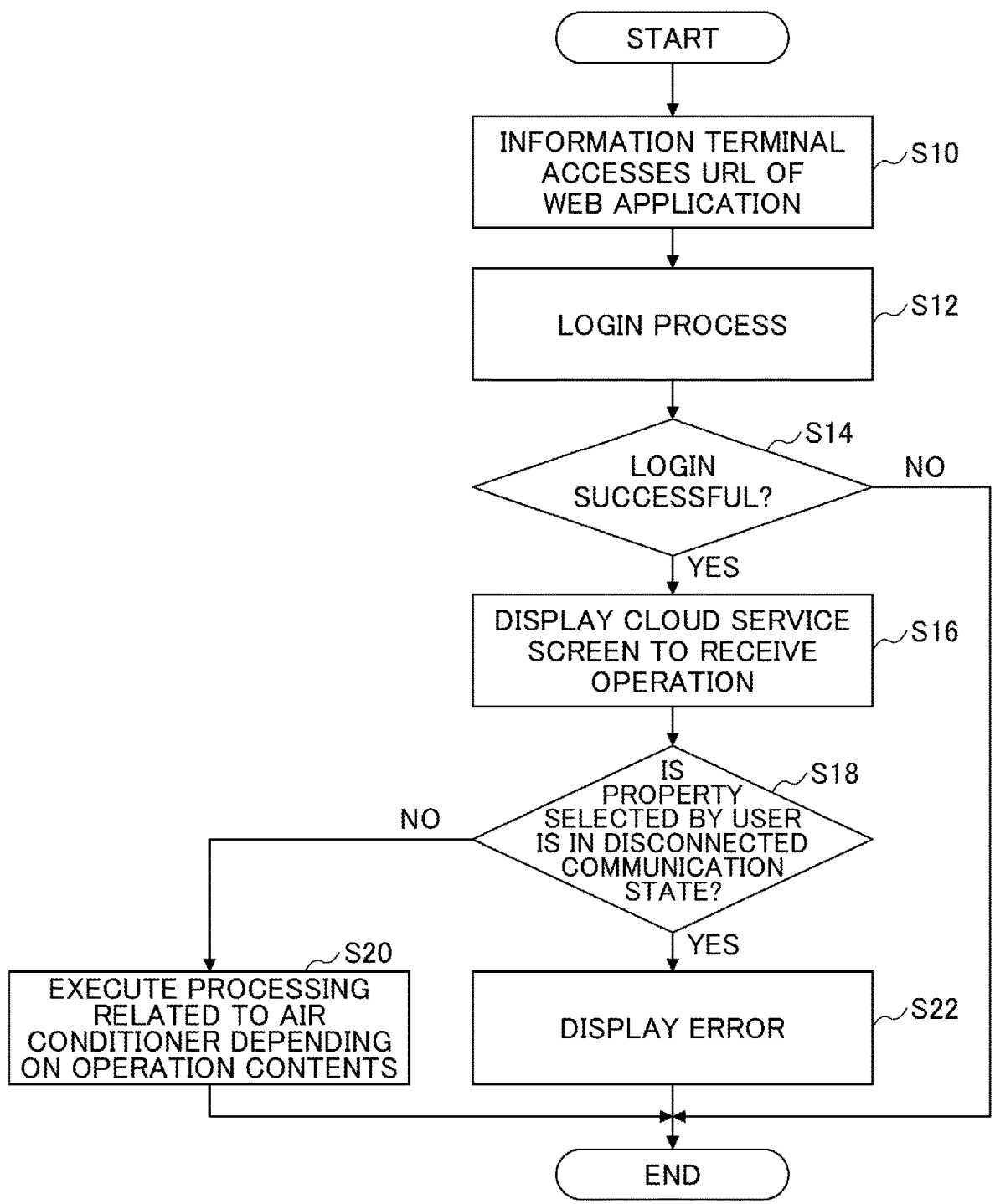
FIG. 10 is a flow chart illustrating an example of processing steps executed by the air conditioning system according to the present embodiment.

FIG. 10 is a flow chart illustrating an example of processing steps executed by the air conditioning system according to the present embodiment. At Step S10, based on an operation performed by the user, the information terminal 20 accesses a URL of the Web application provided by the management device 10.

At Step S12, the management device 10 encourages the user to input the user ID and the password by displaying a login screen on the information terminal 20. The management device 10 executes a login process by collating the user ID and the password input by the user, with the user information stored in the user information storage unit 62.

At Step S14, the management device 10 determines whether or not the login is successful. If it is determined that the login is successful, the management device 10 proceeds to Step S16, and displays, for example, a cloud service screen 1000 illustrated in FIG. 11 on the information terminal 20, to receive an operation performed by the user on the cloud service screen 1000. If it is determined that the login is not successful, the management device 10 ends the process illustrated in FIG. 10.

Figure 11:
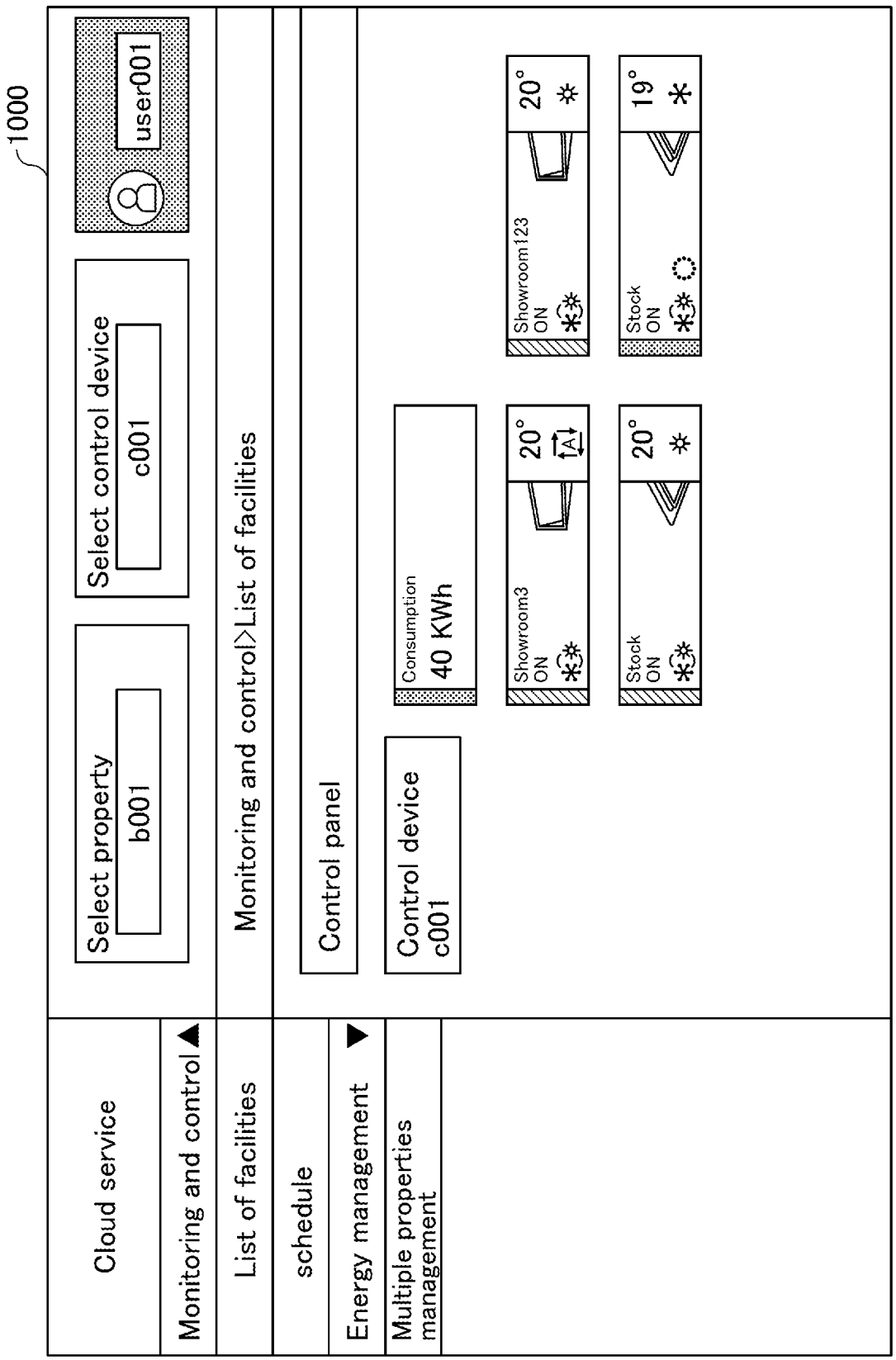
FIG. 11 is a schematic diagram of an example of a cloud service screen according to the present embodiment.

FIG. 11 is an example of a schematic diagram of the cloud service screen according to the present embodiment. The cloud service screen 1000 in FIG. 11 is an example of a screen for receiving operation contents, for executing processing related to the air conditioner 18 from the user of the information terminal 20. The cloud service screen 1000 in FIG. 11 receives operation contents for executing "Monitoring and control", "Energy management", and "Multiple properties management", as examples of the processing related to the air conditioner 18.

For example, FIG. 11 is an example of a screen displayed on the information terminal 20 in the case where the management device 10 receives operation contents of selecting "Monitoring and control>list of facilities" from the information terminal 20. On the cloud service screen 1000 in FIG. 11, information on four air conditioners 18 that are selected by the user of the information terminal 20 as targets to be controlled by the control device 16 is displayed.

Also, the cloud service screen 1000 in FIG. 11 receives from the user of the information terminal 20 a selection of a property and the control device 16 for which the processing related to the air conditioner 18 is to be executed. The properties and the control devices 16 that can be selected by the user of the information terminal 20 on the cloud service screen 1000 are properties associated with the user who has successfully logged in, and control devices 16 provided in the properties.

By using the property information in FIG. 7, the management device 10 can confirm the state of connection/disconnection of communication with the control device 16 provided in the user-selected property. Note that upon receiving a selection of a property on the cloud service screen 1000, the management device 10 may determine whether the communication with the control device 16 in the selected property is connected/disconnected, by accessing the communication address of the control device 16. At Step S18, the management device 10 determines whether or not the communication state with the control device 16 selected by the user is disconnected. If it is determined that the communication state with the control device 16 selected by the user is not disconnected, the management device 10 proceeds to Step S20, to execute processing related to the air conditioner 18 according to the operation contents received from the information terminal 20.

Figure 12:
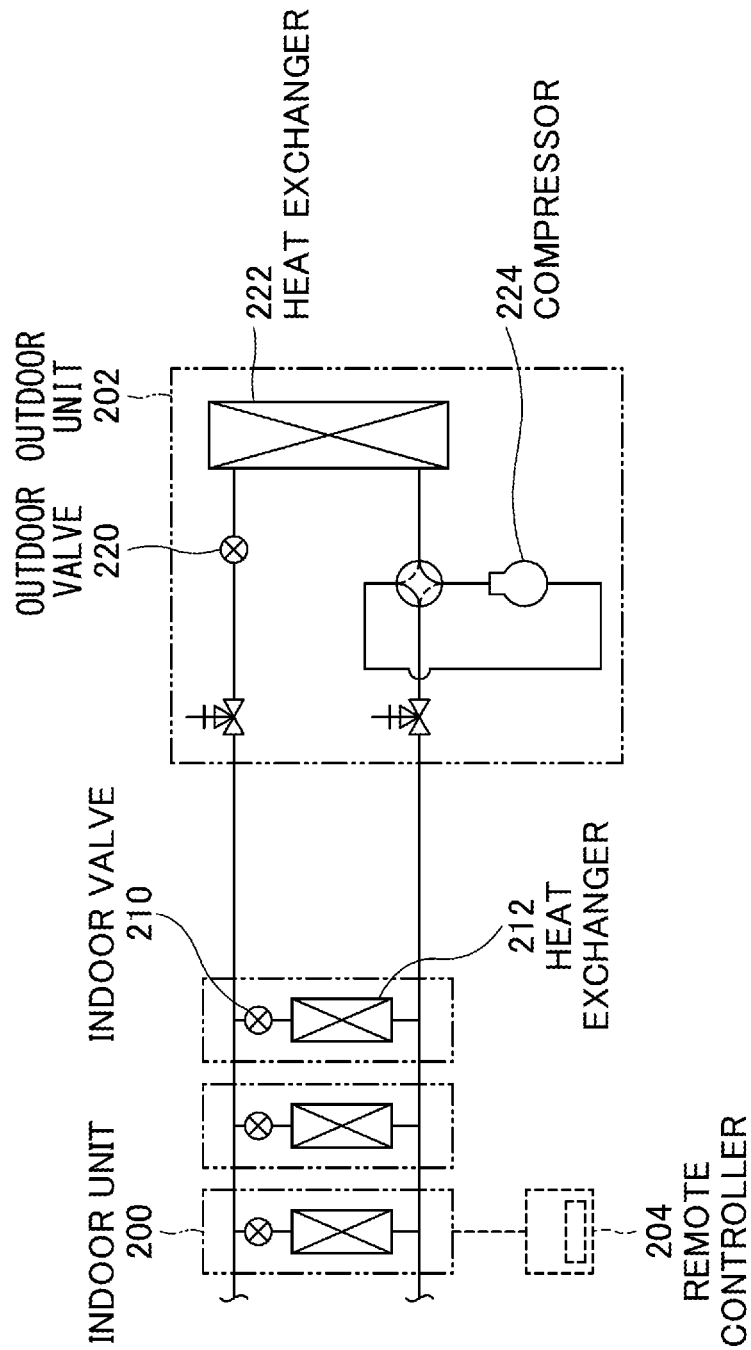
FIG. 12 is an explanatory diagram of an example of a power suppression control function and a power suppression control release function according to the present embodiment.

Note that, for example, in the case of a refrigerant circuit diagram in FIG. 12, the power suppression control function and the power suppression control release function as examples of the processing related to the air conditioner 18 are executed as follows. FIG. 12 is an explanatory diagram of an example of the power suppression control function and the power suppression control release function according to the present embodiment.

The refrigerant circuit diagram in FIG. 12 shows an example in which multiple indoor units 200 are connected. An outdoor unit 202 is provided with an outdoor valve 220. In the case where multiple indoor units 200 are expected to be connected, each of the indoor units 200 is provided with an indoor valve 210 for performance adjustment on the indoor unit 200 side. In the case where only one indoor unit 200 is connected, either the indoor valve 210 of the indoor unit 200 or the outdoor valve 220 of the outdoor unit 202 may be provided. The performance of the indoor unit 200 is controlled by controlling the flow rate of the refrigerant in at least one of the indoor valve 210 or the outdoor valve 220.

For example, in the refrigerant circuit diagram in FIG. 12, the flow rate of the refrigerant flowing through a heat exchanger 212 of the indoor unit 200 having the indoor valve 210 narrowed is reduced. Accordingly, the heat exchange performance decreases in the heat exchanger 212 of the indoor unit 200 having the indoor valve 210 narrowed. Also, the amount of the refrigerant required to be transported becomes less, and thereby, the outdoor unit 202 can be operated with a reduced performance of the compressor 224, and hence, the power consumption can be suppressed.

Note that in the refrigerant circuit diagram in FIG. 12, in the case where the power suppression control is applied to all of the indoor units 200, the heat exchange performance of the heat exchanger 212 may be reduced by narrowing down the outdoor valve 220 of the outdoor unit 202, to reduce the flow rate of the refrigerant flowing through the heat exchanger 212 of the indoor unit 200.

Also, in the refrigerant circuit diagram in FIG. 12, in the case where the bower suppression control is applied to all of the indoor units 200, the outdoor valve 220 of the outdoor unit 202 may be closed to make the flow rate of the refrigerant flowing through the heat exchanger 212 of the indoor unit 200 become zero, or the compressor 224 of the outdoor unit 202 may be stopped (the outdoor unit 202 is turned off) to stop the heat exchange capability of the heat exchanger 212.

In this way, by controlling the opening of the valve to adjust the flow rate of the refrigerant in the air conditioner 18 and the performance of the compressor, the management device 10 can implement the power suppression control function and the power suppression control release function as examples of the processing related to the air conditioner 18. For example, the management device 10 determines a target indoor temperature, and transmits a command to the control device 16 to control the opening of the valve and the performance of the compressor in accordance with the target indoor temperature. Note that on-demand power suppression control of the air conditioner 18 is well-known art as described in, for example, Japanese Laid-Open Patent Application 2011-149572.

Returning to Step S18 in FIG. 10, the description continues. At Step S18, if it is determined that the communication state with the control device 16 selected by the user is disconnected, the management device 10 proceeds to Step S22, to display an error screen. By the error screen, the management device 10 informs the user that the communication state between the management device 10 and the control device 16 is disconnected, and that the air conditioner 18 cannot be operated from the Web application.

As illustrated in the flow chart in FIG. 10, if the communication state between the management device 10 and the control device 16 is not disconnected, the user can cause the air conditioner 18 to be in the power suppression control state or can release the power suppression control state on the cloud service screen 1000 displayed by the Web application.

On the other hand, if the communication state between the management device 10 and the control device 16 is disconnected, the user can release the power suppression control state of the air conditioner 18 on the local service screen displayed by the local application.

Figure 13:
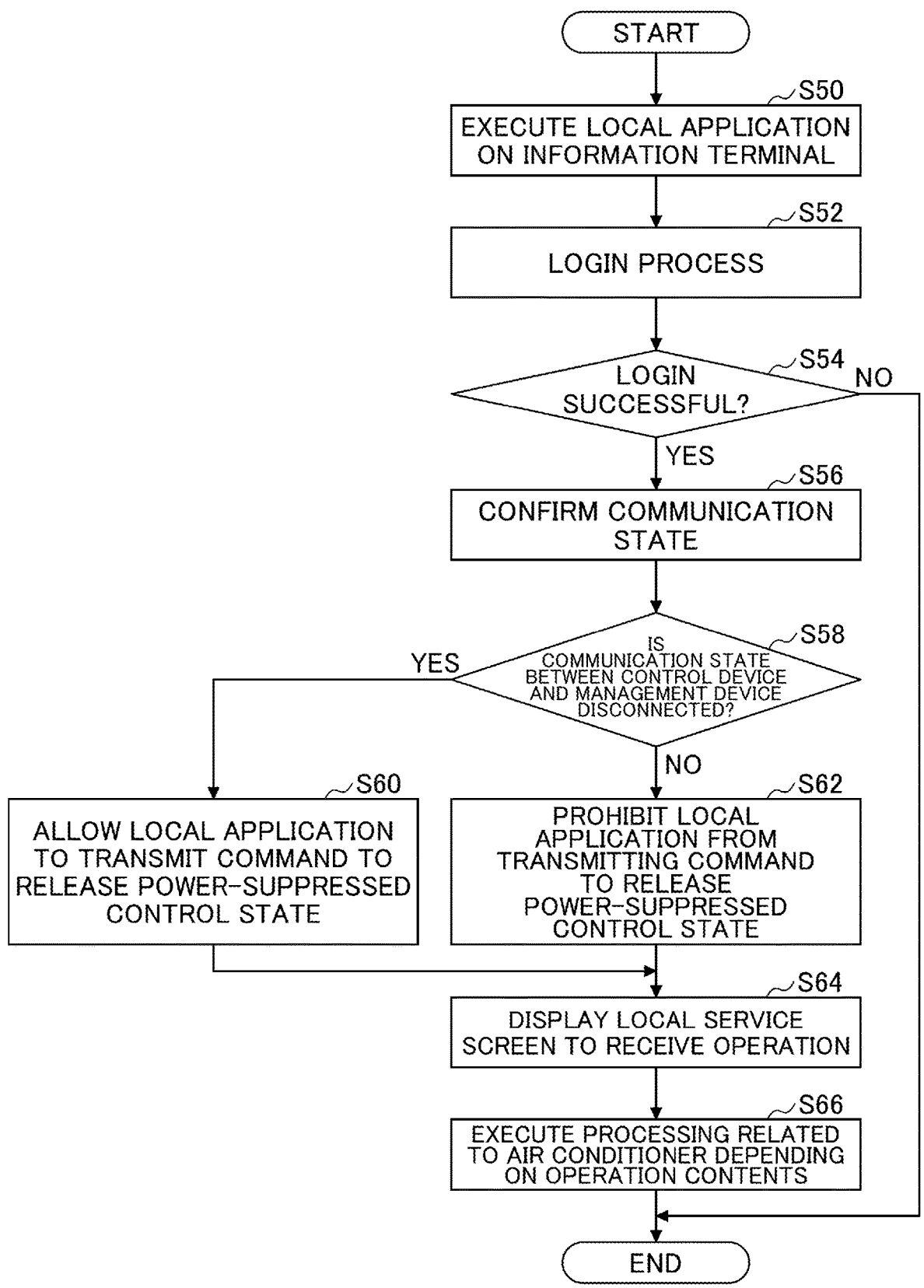
FIG. 13 is a flow chart of an example of a process executed by a local application according to the present embodiment.

FIG. 13 is a flow chart of an example of a process executed by a local application according to the present embodiment. At Step S50, the information terminal 20 executes the local application based on an operation performed by the user. The information terminal 20 on which the local application is being executed accesses the control device 16 via the local network.

Figure 14:
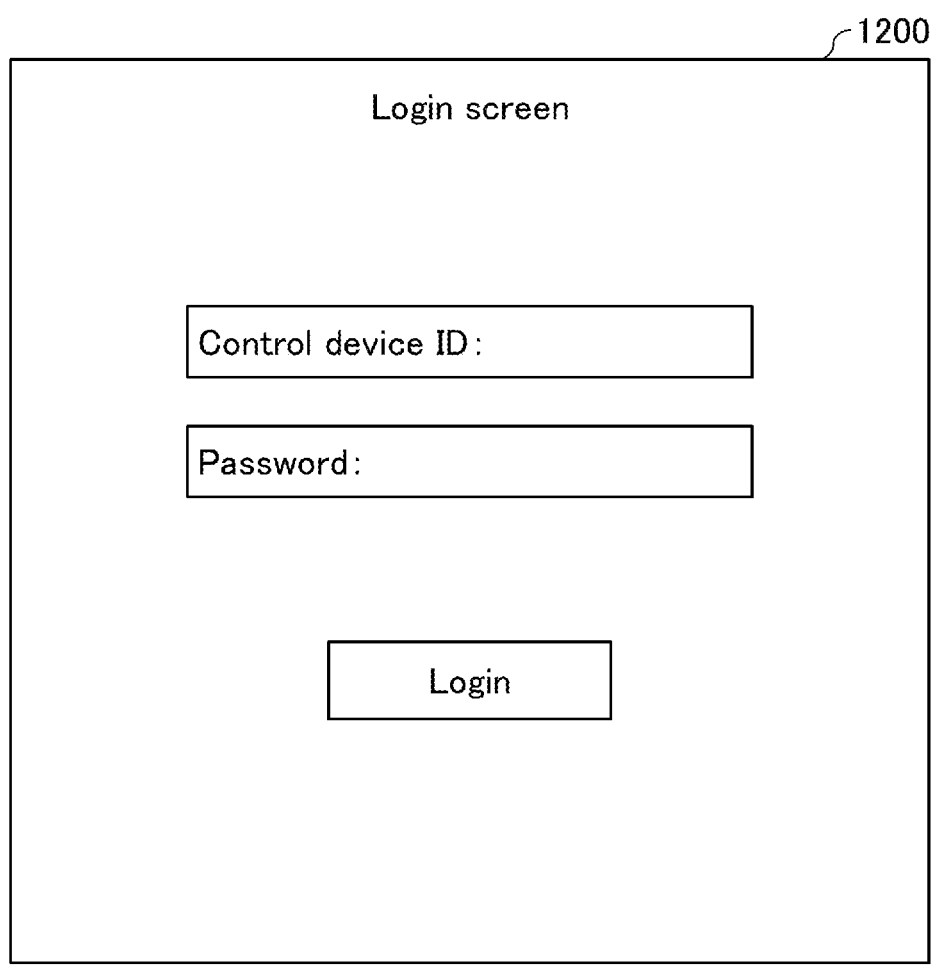
FIG. 14 is a schematic diagram of an example of a login screen according to the present embodiment.
Figure 15:
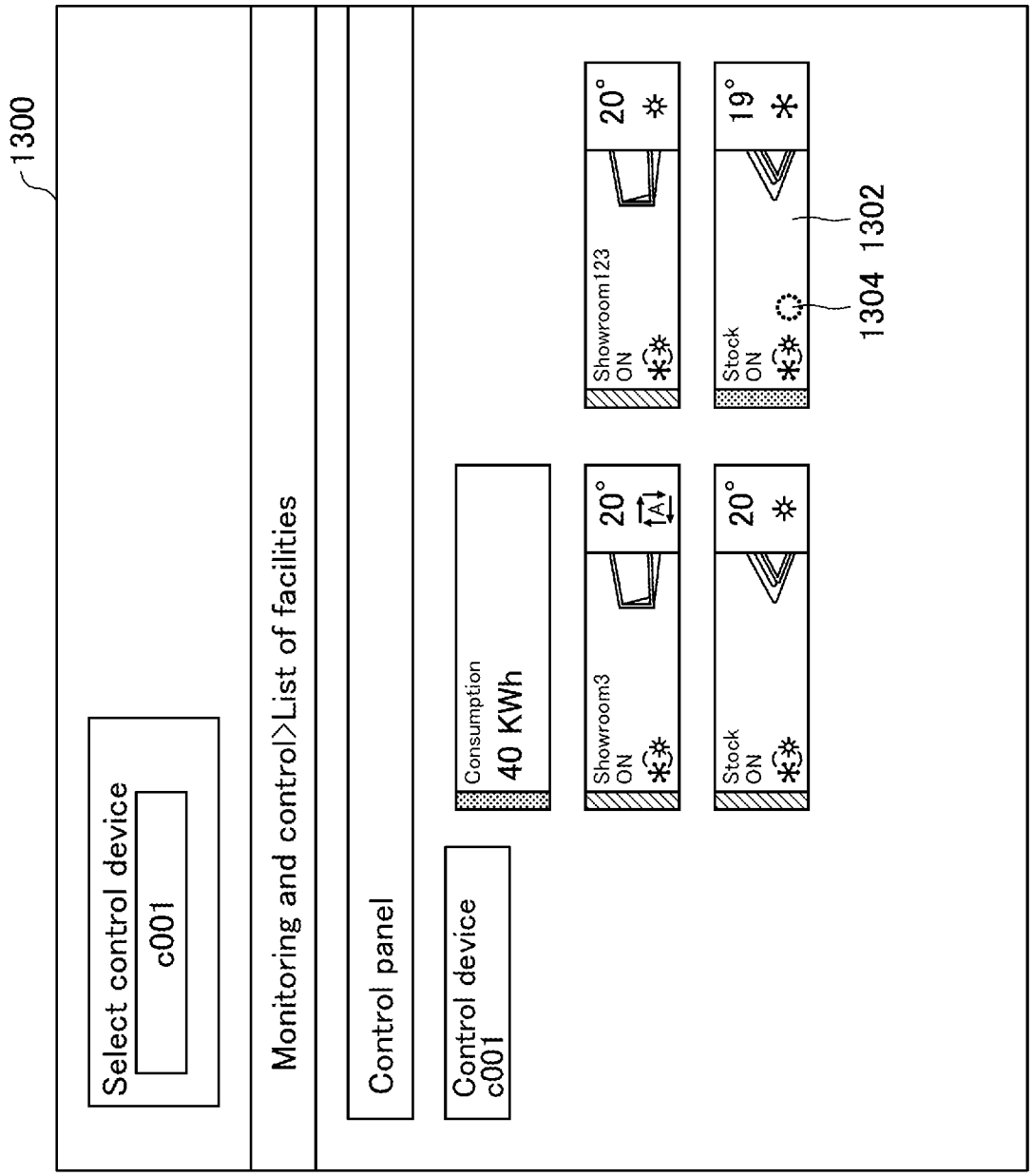
FIG. 15 is a schematic diagram of an example of a local service screen according to the present embodiment.

At Step S52, the control device 16 displays a login screen 1200 in FIG. 15, for example, on the information terminal 20. FIG. 14 is a schematic diagram of an example of a login screen according to the present embodiment. The login screen 1200 in FIG. 14 is an example of a screen for encouraging the user to input the control device ID and the password. Note that as the control device ID, the control device ID of the control device 16 being accessed may be automatically taken as input, or the user may be encouraged to select from among multiple control device IDs. The control device 16 executes a login process by collating the control device ID and the password input by the user, with the password information stored in the password storage unit 108.

Note that a login process at Step S52 may be modified to improve the security, for example, by having a certificate of the control device 16 recorded on the local application, so as to use the certificate of the control device 16 in the login process.

At Step S54, the control device 16 determines whether or not the login is successful. If it is determined that the login is successful, the control device 16 proceeds to Step S56 to confirm the communication state between the management device 10 and the control device 16. Note that if it is determined that the login is not successful, the control device 16 ends the process illustrated in FIG. 13.

The control device 16 proceeds to Step S58 following Step S56, to determine whether or not the communication state between the management device 10 and the control device 16 is disconnected. If the communication state between the management device 10 and the control device 16 is disconnected, the control device 16 proceeds to Step S60, to allow the local application to transmit a command to release the power-suppressed control state. On the other hand, if the communication state between the management device 10 and the control device 16 is not disconnected, the control device 16 proceeds to Step S62, to prohibit the local application from transmitting a command to release the power-suppressed control state.

In this way, the command to release the power-suppressed control state from the local application is allowed if the communication state between the management device 10 and the control device 16 is disconnected, whereas the command is prohibited if the communication state between the management device 10 and the control device 16 is not disconnected. This is because the command to release the power-suppressed control state from the Web application can be issued if the communication state between the management device 10 and the control device 16 is not disconnected.

The control device 16 proceeds to Step S64, to display, for example, a local service screen 1300 illustrated in FIG. 15 on the information terminal 20, to receive an operation performed by the user on the local service screen 1300. The control device 16 proceeds to Step S66, and can execute processing related to the air conditioner 18 according to the operation contents received from the user of the information terminal 20.

FIG. 15 is an example of a schematic diagram of the local service screen according to the present embodiment. On the local service screen 1300 in FIG. 15, information 1302 on four air conditioners 18 as targets to be controlled by the control device 16 accessed from the information terminal 20 on which the local application is executed, is displayed to be selectable. Note that on the local service screen 1300 in FIG. 15, a mark 1304 displayed on the information 1302 of an air conditioner 18 at the lower right indicates that the air conditioner 18 is under power suppression control.

Figure 16:
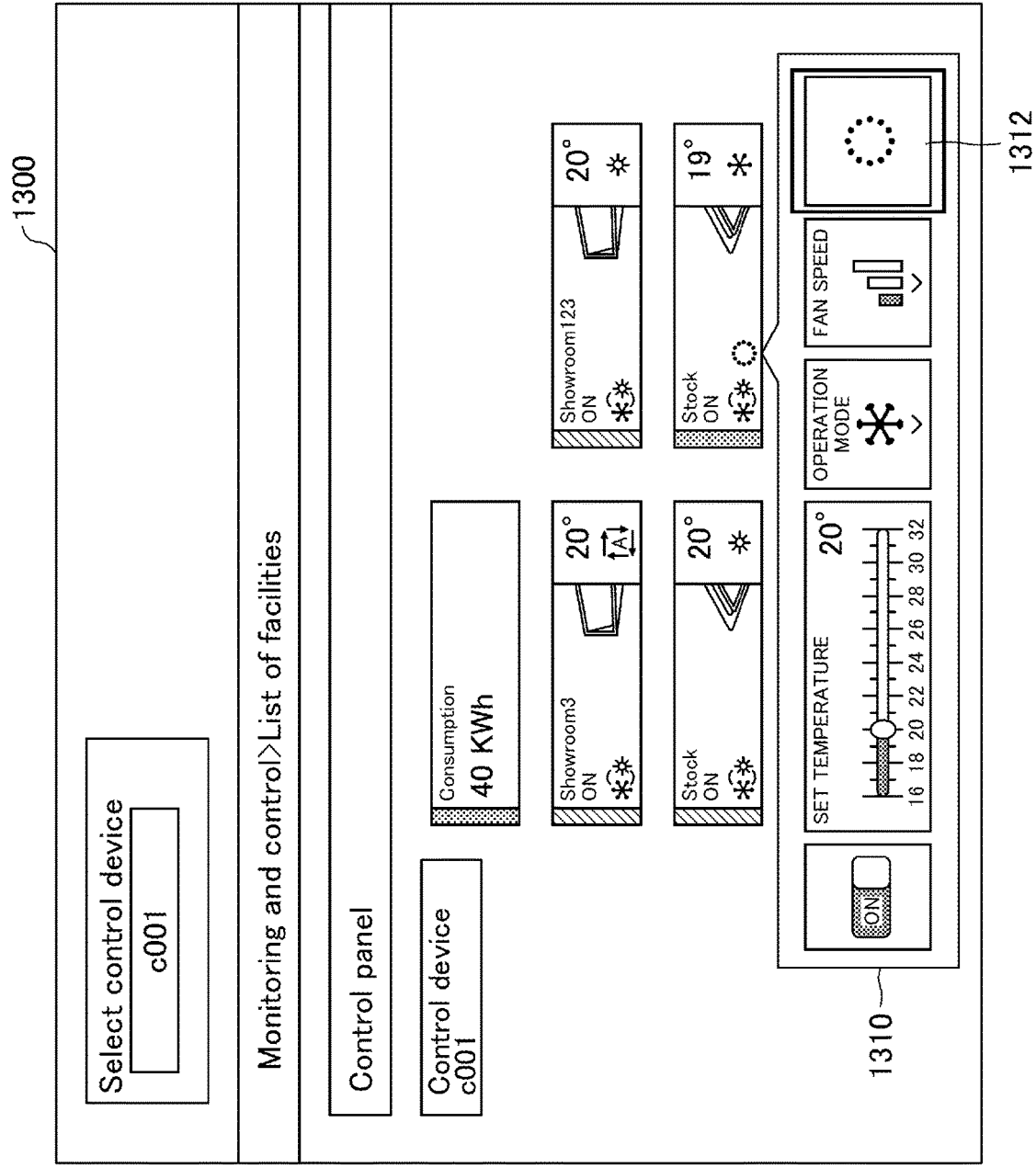
FIG. 16 is an example of a schematic diagram of a local service screen on which an operation panel is displayed.

For example, once the information 1302 of the air conditioner 18 is selected by the user with a tapping operation or the like at Step S64, the local service screen 1300 transitions to a screen as illustrated in FIG. 16. FIG. 16 is an example of a schematic diagram of a local service screen on which an operation panel is displayed. The local service screen 1300 in FIG. 16 displays an operation panel 1310 corresponding to the information 1302 of the air conditioner 18 selected by the user.

Figure 17:
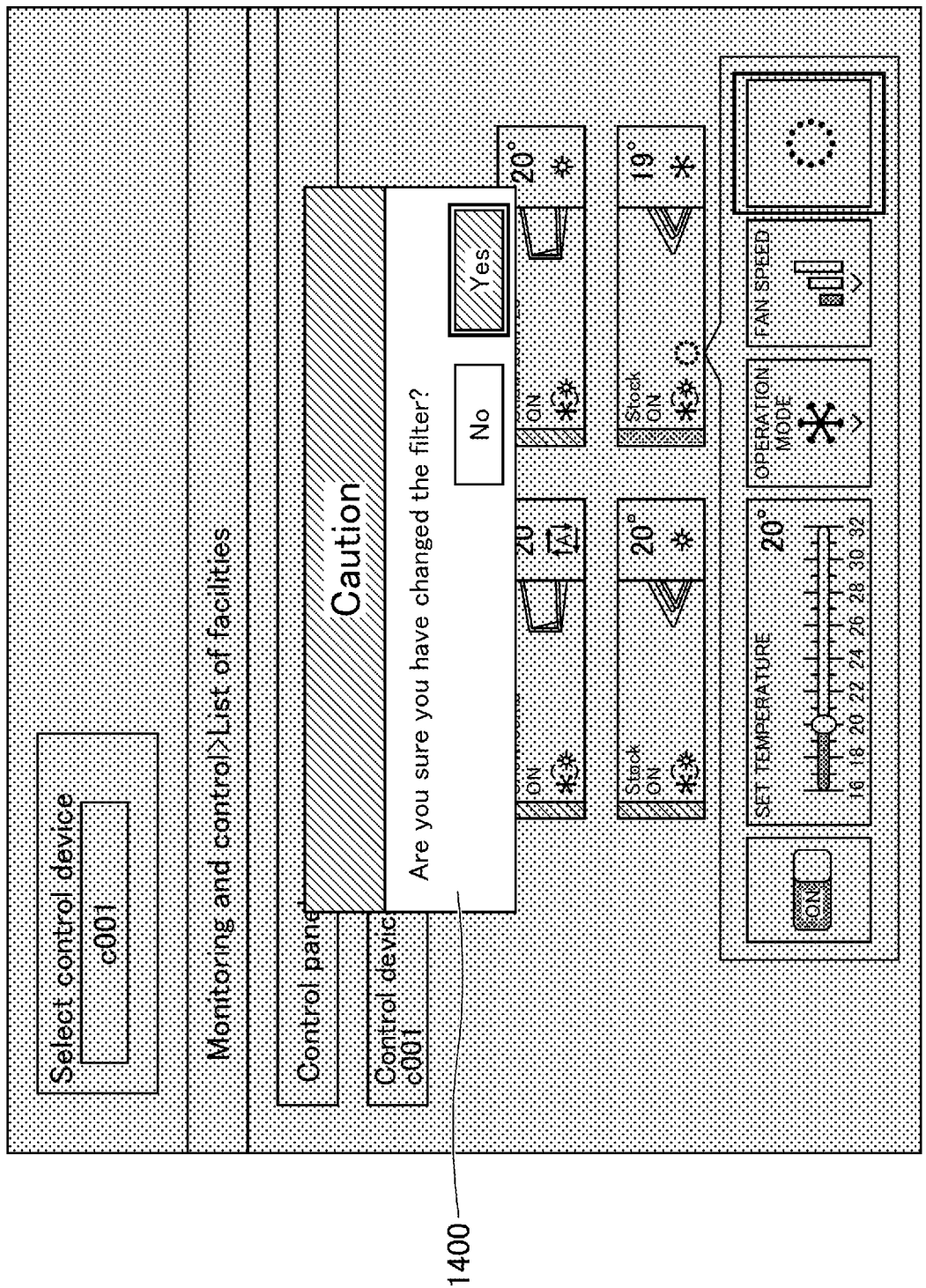
FIG. 17 is an example of a schematic diagram of a local service screen on which a confirmation dialog is displayed.

A power suppression control release button 1312 is displayed on the operation panel 1310. The user can issue a command to release the power suppression control state by selecting the power suppression control release button 1312 with a tapping operation or the like. For example, in the case where the power suppression control release button 1312 is selected by the user with a tapping operation or the like, the local service screen 1300 displays a confirmation dialog 1400 in FIG. 17, to ask the user for confirmation. FIG. 17 is an example of a schematic diagram of a local service screen on which a confirmation dialog is displayed.

Figure 18:
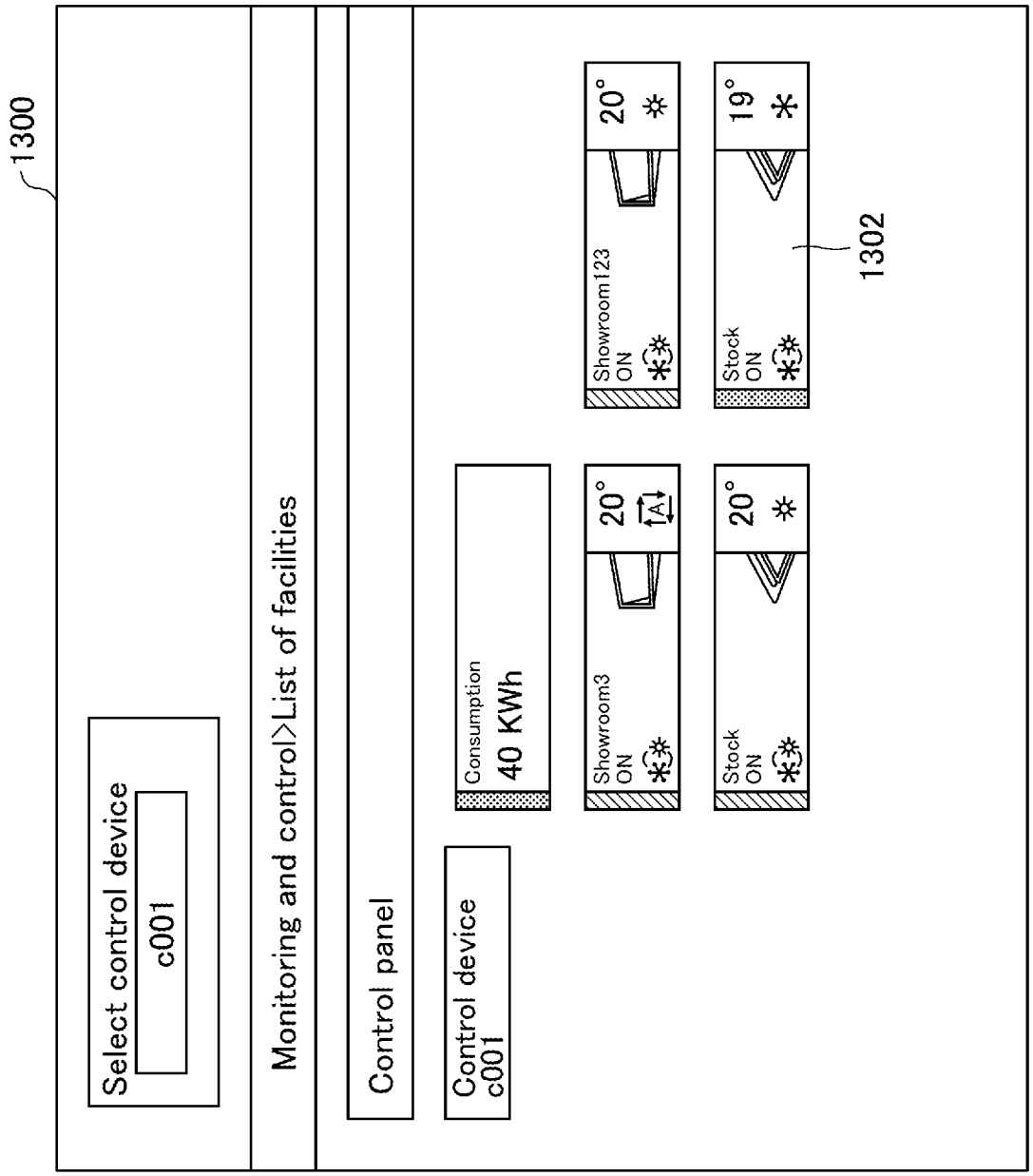
FIG. 18 is a schematic diagram of an example of a local service screen according to the present embodiment.

Once the "Yes" button on the confirmation dialog 1400 is pressed, the control device 16 executes a process of releasing the power suppression control state of the air conditioner 18 corresponding to the information 1302 of the air conditioner 18 selected at Step S64. On the local service screen 1300 after releasing the power suppression control state of the air conditioner 18, as illustrated in FIG. 18, the mark 1304 indicating that the air conditioner 18 is under power suppression control is deleted.

The processing of the flow chart in FIG. 13 is an example of prohibiting the local application from transmitting a command to release the power-suppressed control state, if the communication state between the management device 10 and the control device 16 is not disconnected.

Figure 19:
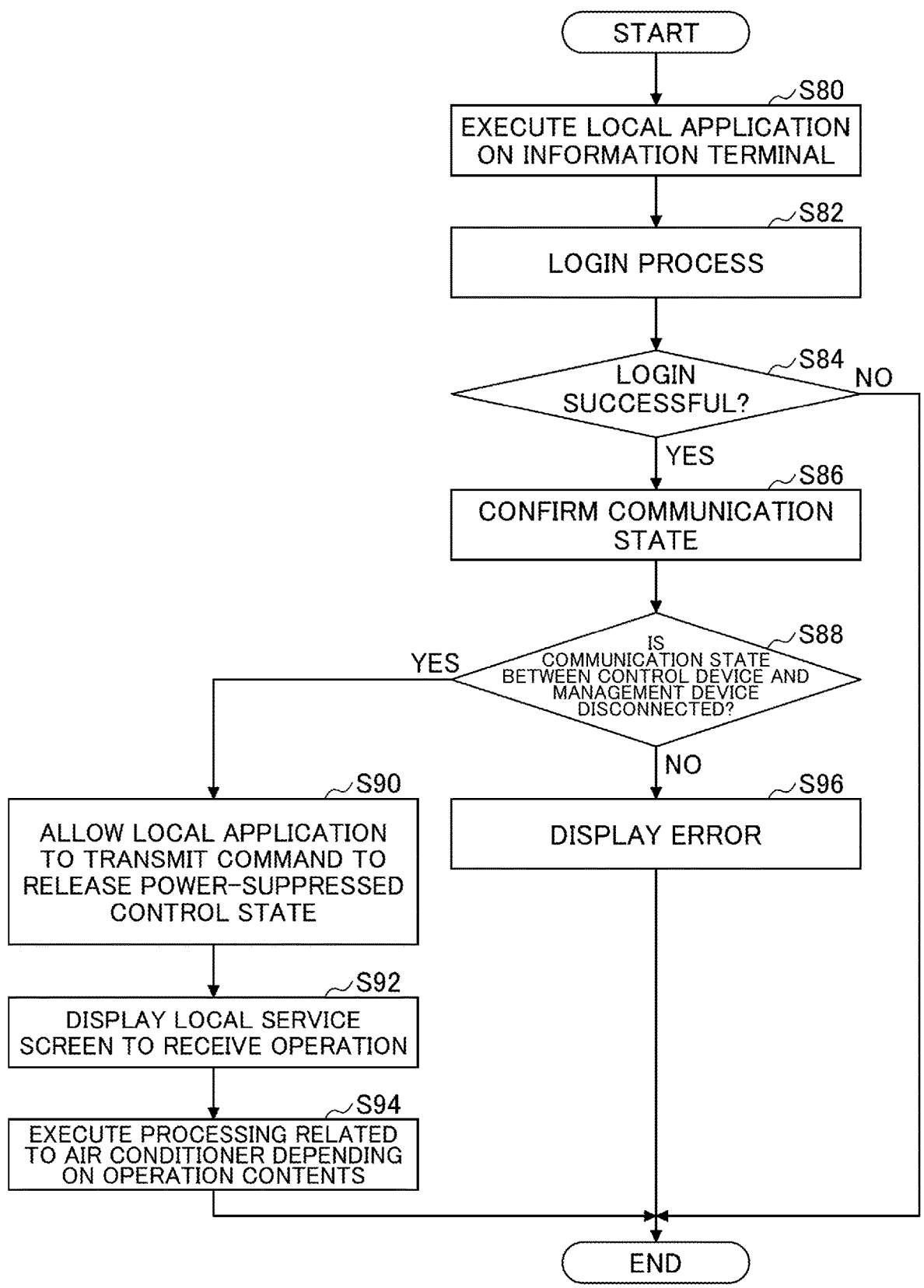
FIG. 19 is a flow chart of an example of a process executed by a local application according to the present embodiment.

For example, as illustrated in FIG. 19, commands other than the command to release the power-suppressed control state may also be prohibited to be transmitted from the local application, in the case where the communication state between the management device 10 and the control device 16 is not disconnected.

FIG. 19 is a flow chart of an example of a process executed by the local application according to the present embodiment. The processing executed at Step S80 to S88 is the same as that in the flow chart illustrated in FIG. 13, and hence, the description is omitted.

If the communication state between the management device 10 and the control device 16 is disconnected, the control device 16 proceeds to Step S90, to allow the local application to transmit a command to release the power-suppressed control state.

The control device 16 proceeds to Step S92, to display, for example, the local service screen 1300 illustrated in FIG. 15 on the information terminal 20, to receive an operation performed by the user on the local service screen 1300. The control device 16 proceeds to Step S94, and can execute the processing related to the air conditioner 18 according to the operation contents received from the user of the information terminal 20.

On the other hand, if the communication state between the management device 10 and the control device 16 is not disconnected, the control device 16 proceeds to Step S96, to display an error screen. By the error screen, the user can determine that the communication state between the management device 10 and the control device 16 is disconnected, and that the air conditioner 18 cannot be operated from the local application.

In this way, a command from the local application is prohibited in the case where the communication state between the management device 10 and the control device 16 is not disconnected. This is because a command can be issued from the Web application if the communication state between the management device 10 and the control device 16 is not disconnected.

Figure 20:
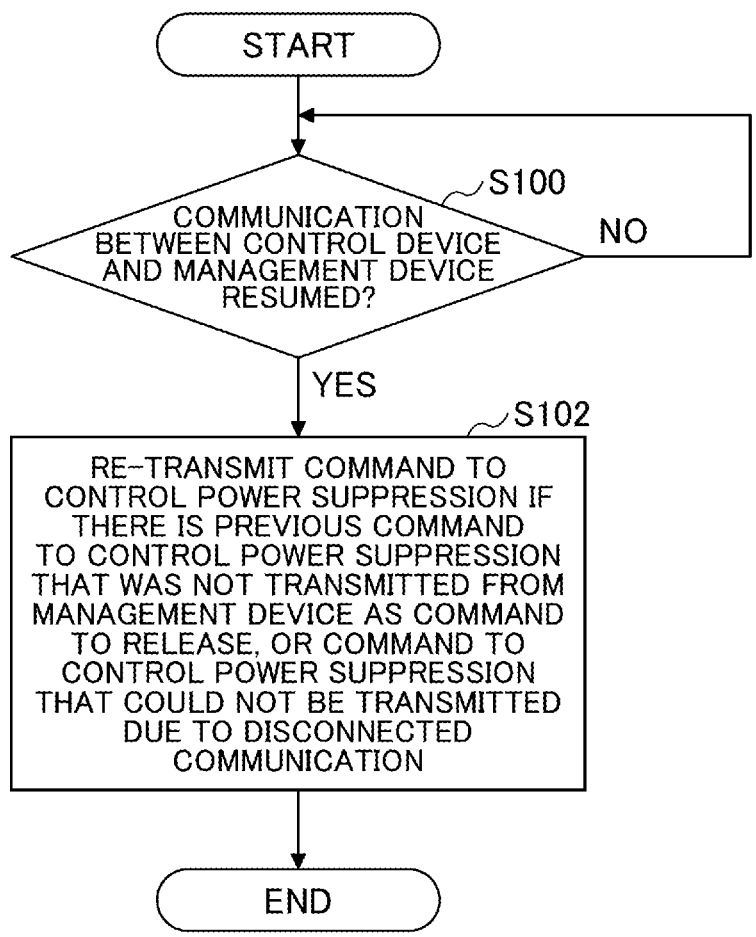
FIG. 20 is a flow chart of an example of a retransmission process of a command to control power suppression of an air conditioner according to the present embodiment.

Note that in the case where communication state between the management device 10 and the control device 16 recovers from disconnection, the management device 10 may re-transmit a command to control power suppression of the air conditioner 18 previously transmitted to the control device 16 via the management device 10, or a command to control power suppression of the air conditioner 18 that could not be transmitted due to disconnected communication, for example, according to steps illustrated in FIG. 20. FIG. 20 is a flow chart of an example of a retransmission process of a command to control power suppression of an air conditioner according to the present embodiment.

If it is determined that the communication with the control device 16 has been recovered, the management device 10 proceeds from Step S100 to S102, and if there is a previous command to control power suppression that is yet to be transmitted from the management device 10, or a command to control power suppression that could not be transmitted due to disconnected communication, re-transmits the command to control power suppression. According to the processing of the flow chart in FIG. 20, the management device 10 can follow commands from the management device 10 after communication with the control device 16 has been recovered.

According to the air conditioning system 1 of the present embodiment, even in the case where communication between the management device 10 and air conditioner 18 is disconnected, the power suppression control state of the air conditioner 18 can be released without intervention of the management device 10.

As above, the present invention has been described with reference to the example embodiments. Note that the present invention is not limited to the above example embodiments, and various modifications can be made within the scope of the claims. The present application claims priority to a base application No. 2019-238423, filed on Dec. 27, 2019, with the Japan Patent Office, the entire contents of which are hereby incorporated by reference.

LIST OF REFERENCE NUMERALS

1 air conditioning system
10 management device
12 download control device
14 router
16 control device
18 air conditioner
20 information terminal
30 network
50 communication unit
52 login control unit
54 screen display control unit
56 communication disconnection confirming unit
58 operation content receiving unit
60 operation content execution control unit
62 user information storage unit
64 property information storage unit
66 facility information storage unit
68 local application download link storage
80 communication unit
82 login request unit
84 Web application execution control unit
86 local application download processing unit
88 local application execution control unit
100 communication unit
102 login control unit
104 operation content receiving unit
106 operation content execution control unit
108 password storage unit
110 air conditioner information storage unit
1000 cloud service screen
1200 login screen
1300 local service screen
1302 information on air conditioner
1304 mark
1310 operation panel
1312 power suppression control release button
1400 confirmation dialog

The invention claimed is:

1. A method of releasing an output-suppressed control state in an air conditioning system that includes a control device configured to control one or more air conditioners, and a management device configured to be connected to the control device via a network to transmit, to the control device, a command to control output suppression of an air conditioner from among the one or more air conditioners to cause the air conditioner to be in the output-suppressed control state, the method comprising:
　a confirmation step of confirming whether communication between the control device and the management device is disconnected; and
　a transmission control step of, in a case where the communication between the control device and the management device is not disconnected, prohibiting transmission of a command to release the output-suppressed control state to the control device without intervention of the management device, and in a case where the communication between the control device and the management device is disconnected, allowing transmission of the command to release the output-suppressed control state to the control device without intervention of the management device.

2. The method of releasing the output-suppressed control state as claimed in claim 1, wherein the transmission control step, in the case where the communication between the control device and the management device is not disconnected, prohibits transmission of the command to release the output-suppressed control state to the control device from an information terminal operated by a user without intervention of the management device, and in the case where the communication between the control device and the management device is disconnected, allows transmission of the command to release the output-suppressed control state to the control device from the information terminal operated by the user without intervention of the management device.

3. The method of releasing the output-suppressed control state as claimed in claim 1, wherein the command to release the output-suppressed control state is a command to release the output-suppressed control state of a user-side device of the air conditioner.

4. The method of releasing the output-suppressed control state as claimed in claim 3, wherein in the output-suppressed control state of the user-side device of the air conditioner, control of setting a target control temperature to a temperature at which output can be suppressed more than at a user-set temperature, is executed.

5. The method of releasing the output-suppressed control state as claimed in claim 1, wherein in a case where the communication between the control device and the management device is recovered from disconnection, a command to control output suppression of the air conditioner that was previously transmitted to the control device via the management device, or could not be transmitted due to disconnected communication, is re-transmitted from the management device.

6. The method of releasing the output-suppressed control state as claimed in claim 1, wherein in the case where the communication between the control device and the management device is not disconnected, the transmission control step prohibits transmission of a command to the control device without intervention of the management device.

7. A non-transitory computer-readable recording medium having computer-readable instructions stored thereon, which when executed, cause an information terminal to execute a method of releasing an output-suppressed control state from the information terminal operated by a user, in an air conditioning system that includes a control device configured to control one or more air conditioners, and a management device configured to be connected to the control device via a network to transmit, to the control device, a command to control output suppression of an air conditioner from among the one or more air conditioners to cause the air conditioner to be in the output-suppressed control state, the method comprising:
confirming whether communication between the control device and the management device is disconnected; and
in a case where the communication between the control device and the management device is not disconnected, prohibiting transmission of a command to release the output-suppressed control state to the control device without intervention of the management device, and in a case where the communication between the control device and the management device is disconnected, allowing transmission of the command to release the output-suppressed control state to the control device without intervention of the management device.

8. An air conditioning system comprising:
a control device configured to control one or more air conditioners; and
a management device configured to be connected to the control device via a network to transmit, to the control device, a command to control output suppression of an air conditioner from among the one or more air conditioners to cause the air conditioner to be in the output-suppressed control state,
wherein a control unit confirms whether communication between the control device and the management device is disconnected, and
executes, in a case where the communication between the control device and the management device is not disconnected, prohibiting transmission of a command to release the output-suppressed control state to the control device without intervention of the management device, and in a case where the communication between the control device and the management device is disconnected, allowing transmission of the command to release the output-suppressed control state to the control device without intervention of the management device.

9. The air conditioning system as claimed in claim 8, wherein the control unit, in the case where the communication between the control device and the management device is not disconnected, prohibits transmission of the command to release the output-suppressed control state to the control device from an information terminal operated by a user without intervention of the management device, and in the case where the communication between the control device and the management device is disconnected, allows transmission of the command to release the output-suppressed control state to the control device from the information terminal operated by the user without intervention of the management device.

10. The air conditioning system as claimed in claim 8, wherein the command to release the output-suppressed control state is a command to release the output-suppressed control state of a user-side device of the air conditioner.

11. The air conditioning system as claimed in claim 10, wherein in the output-suppressed control state of the user-side device of the air conditioner, control of setting a target control temperature to a temperature at which output can be suppressed more than at a user-set temperature, is executed.

12. The air conditioning system as claimed in claim 8, wherein in a case where the communication between the control device and the management device is recovered from disconnection, a command to control output suppression of the air conditioner that was previously transmitted to the control device via the management device, or could not be transmitted due to disconnected communication, is re-transmitted from the management device.

13. The air conditioning system as claimed in claim 8, wherein in the case where the communication between the control device and the management device is not disconnected, the control unit prohibits transmission of a command to the control device without intervention of the management device.

* * * * *